United States Patent

Imaeda

[19]

[11] Patent Number: 6,094,212
[45] Date of Patent: *Jul. 25, 2000

[54] COMMUNICATION APPARATUS AND COMMUNICATION METHOD USING DUMMY DATA

[75] Inventor: Eiji Imaeda, Taira-machi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,492

[22] Filed: Jan. 8, 1997

[30] Foreign Application Priority Data

Jan. 10, 1996 [JP] Japan ................................. 8-018276

[51] Int. Cl.⁷ .............................. H04N 7/15; H04N 7/14
[52] U.S. Cl. ............................ 348/14; 348/17; 348/15; 348/12; 348/500; 370/260; 370/264
[58] Field of Search ........................... 348/15, 17, 14, 348/13, 12, 464, 500; 370/264, 260, 503, 504, 505; 375/356; 379/88.13; H04N 7/14, 7/15

[56] References Cited

U.S. PATENT DOCUMENTS

| | | | |
|---|---|---|---|
| 5,365,265 | 11/1994 | Shibata et al. | 348/15 |
| 5,402,418 | 3/1995 | Shibata et al. | 348/15 |
| 5,412,418 | 5/1995 | Nishimura et al. | 348/14 |
| 5,414,457 | 5/1995 | Kadowaki et al. | 348/14 |
| 5,473,366 | 12/1995 | Imaeda et al. | 348/14 |
| 5,509,009 | 4/1996 | Laycock et al. | 348/15 |
| 5,539,811 | 7/1996 | Nakamura et al. | 348/14 |
| 5,541,639 | 7/1996 | Takatsuki et al. | 348/15 |
| 5,546,324 | 8/1996 | Palmer et al. | 348/15 |
| 5,548,591 | 8/1996 | Horikoshi | 370/62 |
| 5,548,789 | 8/1996 | Nakanura | 379/89 |
| 5,585,839 | 12/1996 | Ishida et al. | 348/16 |
| 5,594,495 | 1/1997 | Palmer et al. | 348/17 |
| 5,594,725 | 1/1997 | Tischler et al. | 370/260 |
| 5,598,351 | 1/1997 | Chater et al. | 348/15 |
| 5,604,738 | 2/1997 | Shibata et al. | 370/264 |
| 5,638,114 | 6/1997 | Hatanaka et al. | 348/15 |
| 5,640,198 | 6/1997 | Makiyama et al. | 348/17 |
| 5,668,738 | 9/1997 | Ataras, III | 348/17 |
| 5,689,553 | 11/1997 | Ahuja et al. | 348/15 |
| 5,703,936 | 12/1997 | Tsuchida et al. | 379/88 |
| 5,717,641 | 2/1998 | Ando et al. | 370/102 |
| 5,751,339 | 5/1998 | Aramaki et al. | 348/17 |
| 5,751,700 | 5/1998 | Imaeda | 348/15 |
| 5,757,781 | 5/1998 | Gilman et al. | 370/260 |
| 5,781,248 | 7/1998 | Chida | 348/13 |
| 5,790,179 | 8/1998 | Shibata et al. | 348/15 |
| 5,822,327 | 10/1998 | Satou | 370/505 |

*Primary Examiner*—John K. Peng
*Assistant Examiner*—Jean W. Désir
*Attorney, Agent, or Firm*—Morgan & Finnegan, L.L.P.

[57] ABSTRACT

This invention proposes to eliminate the limitation that the reception data, assigned to a subchannel, cannot be re-assigned to another subchannel in the transmission. For this purpose, in a configuration of the present invention, the transmission information, formed by multiplexing information of plural kinds in a multiplexing unit, is transmitted to a line control unit which is connected to a communication line and serves to transmit and receive information to and from different locations, while the reception information received from the communication line is received by the line control unit and separated in a demultiplexing unit into the information of respective kinds, and at least one is selected by an entire control unit from thus separated plural information and is turned back to the multiplexing unit through a turn-back bus.

14 Claims, 19 Drawing Sheets

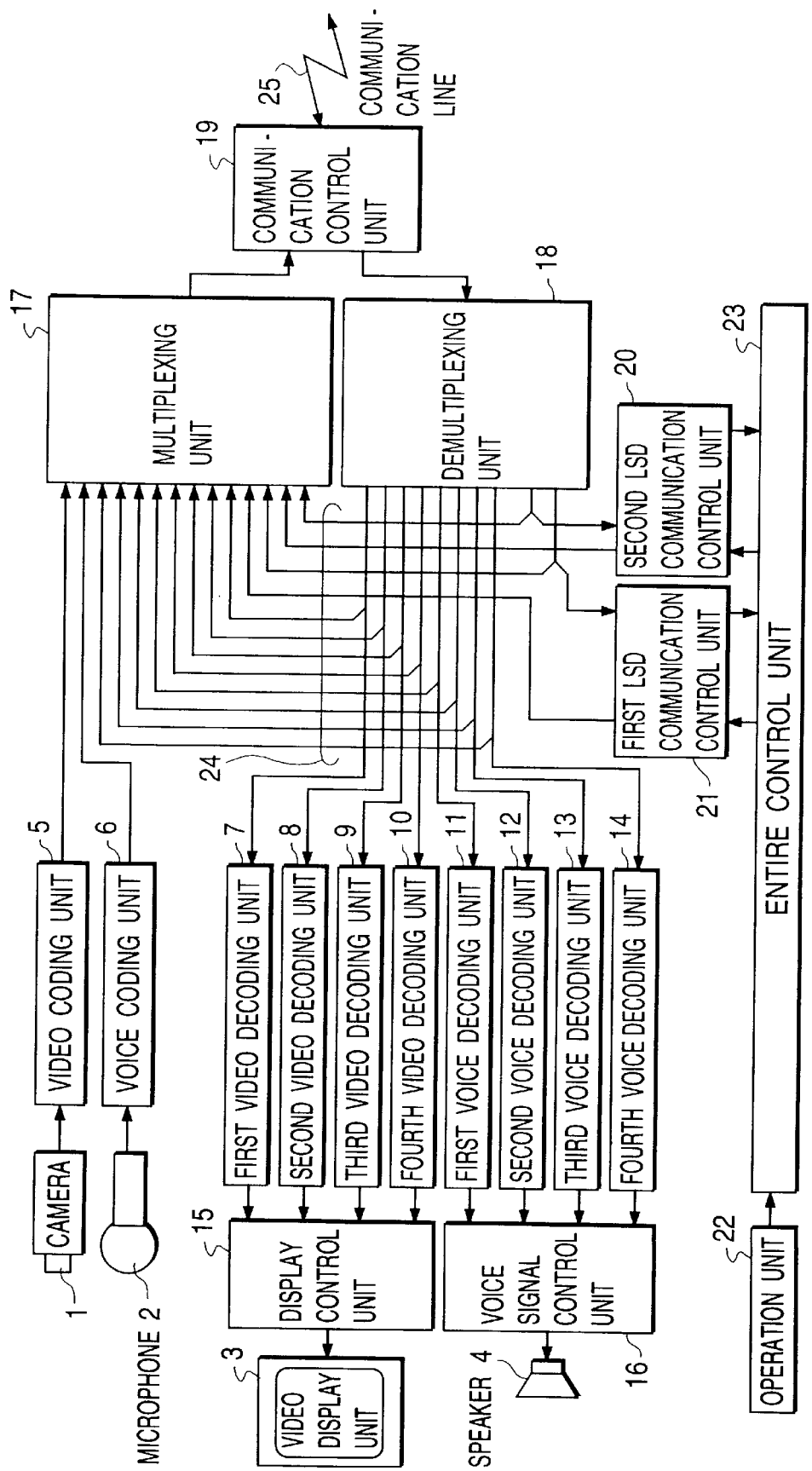

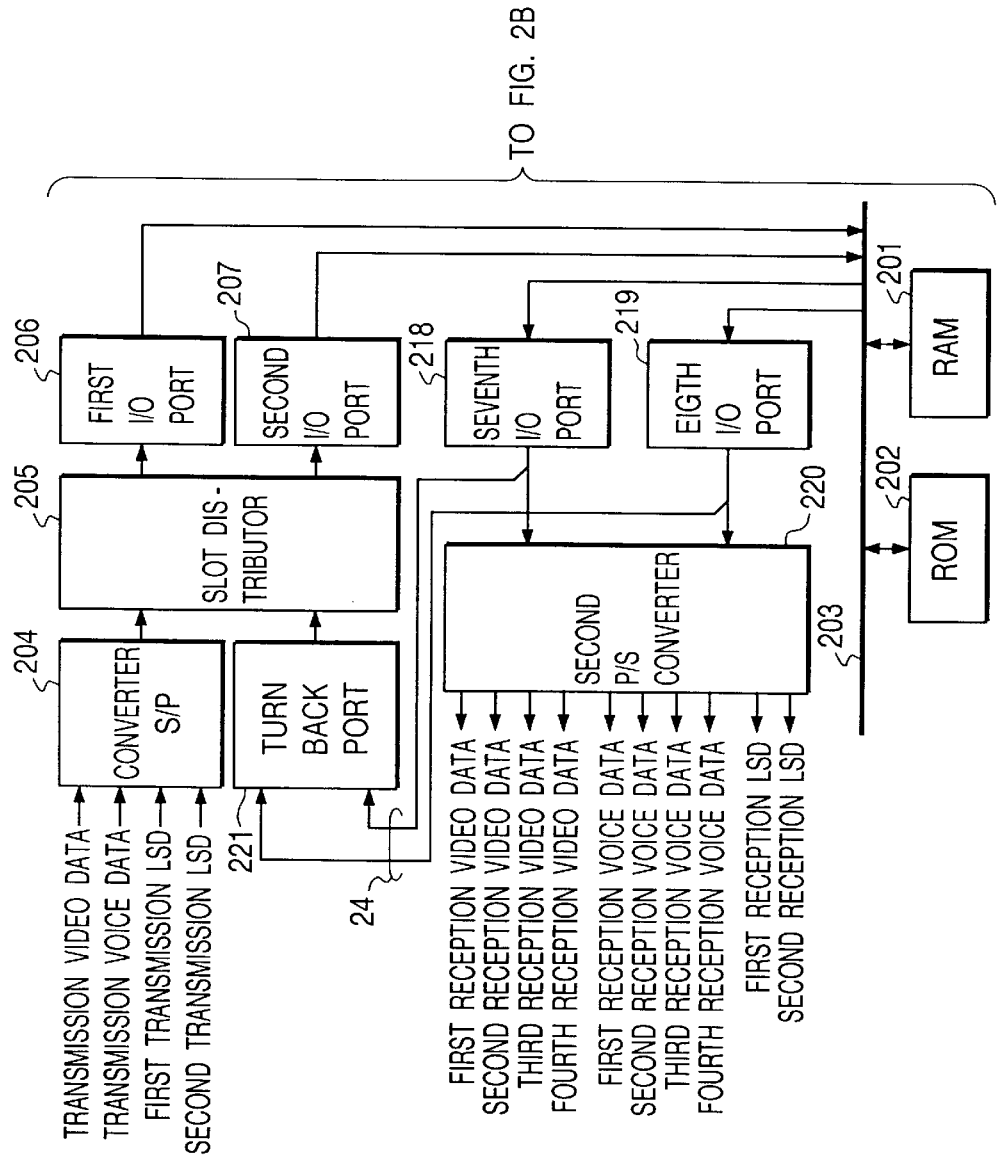

EVEN FRAME

ODD FRAME

COMMUNICATION APPARATUS AND COMMUNICATION METHOD USING DUMMY DATA

BACKGROUND OF THE INVENTION

1. Field of the Invention

The present invention relates to a communication apparatus and a communication method for effecting communication of information of plural kinds among plural locations.

2. Related Background Art

In the field of digital communication line consisting of an information channel and a signal channel, the ISDN (integrated services digital network) has recently been standardized by the ITU-TS (former CCITT) and its commercial use is being promoted.

As a communication apparatus for handling the audio and video media through such ISDN services, there is known a multimedia communication apparatus exemplified by a television telephone. Such multimedia communication apparatuses execute communication, utilizing a common function among those of the respective apparatuses. It is therefore necessary, among such multimedia communication apparatuses, to have a common structure of the transmission frame for multiplexing the media signals such as of voice, image and other data on the communication channel. Such transmission frame structure is defined in the recommendation H.221 of ITU-TS. Also the various transmission modes between the mutually communicating terminals are defined by the recommendation H.242 of the ITU-TS.

FIG. 18 shows an example of the transmission frame structure defined by the recommendation H.221 of ITU-TS, wherein a frame synchronization signal FAS is composed of frame information, control information, alarm information, etc. A bit rate assignment signal BAS is composed, for example, of a terminal ability for variously structuring the channels in the frame. In FIG. 18, a structure of 80 bits in the vertical direction, corresponding to the octet numbers, is called a subchannel. The subchannels are numbers in succession from a subchannel #1 to a subchannel #8. The subchannel #8, in which the first 16 bits are assigned to the FAS and BAS mentioned above, is composed of the remaining 64 bits. The transmitted data of each medium are assigned in the unit of each subchannel. In case of data transmission in the frame structure according to the ITU-TS recommendation H.221, the FAS and BAS are added in each frame.

An even-numbered frame and an odd-numbered frame constitute a sub-multi frame, and 8 sub-multi frames constitute a multi frame. The FAS and BAS mentioned above are defined in the pair of the even- and odd-numbered frames, and a bit pattern of a frame synchronizing word, called FAW, is inserted in the FAS of the even frame and that of the odd frame. As shown in FIGS. 19A and 19B, the FAW bit pattern has "0011011" in the second to eighth octet numbers in the even frame and "1" in the second octet number in the odd frame.

In the following there will be considered a case of communication with the data of the above-explained frame structure, among the terminals connected in a ring shape as shown in FIG. 11.

A terminal A receives and reproduces the multimedia data defined by the above-explained frame structure and generated in terminals B and C. It also deletes the data of the terminal C, stores the multimedia data generated in the terminal A into an area formed in the frame by such deletion and transmits the data to a terminal E.

A terminal A receives and reproduces the multimedia data defined by the above-explained frame structure and generated in terminal B and C. It also deletes the data of the terminal C, stores the multimedia data generated in the terminal A into an area formed in the frame by such deletion and transmits the data to a terminal E.

Also, the terminal A receives and reproduces the multimedia data defined by the above-explained frame structure and generated in terminal D and E. It deletes the data of the terminal D, stores the multimedia data generated in the terminal A into an area formed in the frame by such deletion and transmits the data to the terminal B.

For generating the data to be transmitted, there is conceived a method of decoding encoded reception multimedia data, and effecting the encoding again to obtain the layout of the frame structure of the recommendation H.221, but such decoding and encoding are time-consuming. Also, such decoding and encoding apply considerable load on the CPU if they are executed in each terminal. Also, the data deterioration may result in such decoding and encoding.

For this reason, there has been conceived a configuration including a process system not effecting the decoding and reproduction, wherein, among the received multimedia data, those merely transmitted to the next terminal are processed by such process system with a change in the area within the frame (such process being hereinafter called turn-back transmission).

However, in the data transmission with the above-explained frame structure of the conventional multimedia communication apparatus, the data assigned to the subchannel #8 have a data rate different from that of other subchannels (smaller data rate because of the FAS/BAS area), so that, in case a partner terminal turns back the received data, the data received in the subchannel #8 cannot be assigned in other subchannels in the turn-back transmission.

Also, even if such assignment is made possible in the transmission, such transmitted data cannot be reproduced in the reception. For this reason, the communication by such turn-back transmission has not been possible.

SUMMARY OF THE INVENTION

In consideration of the foregoing, an object of the present invention is to provide a communication apparatus and a communication method capable of resolving the above-mentioned drawbacks. Another object of the present invention is to provide a communication apparatus and a communication method, allowing to assign the reception data assigned in a subchannel to any other subchannel in the transmission.

Still another object of the present invention is to provide a communication apparatus and a communication method allow to receive the data transmitted by a partner terminal by assigning the reception data of a subchannel to any other subchannel.

Still another object of the present invention is to provide a communication apparatus and a communication method having novel functions.

BRIEF DESCRIPTION OF THE DRAWINGS

FIG. 1 is a block diagram showing the configuration of a multimedia communication apparatus constituting a first embodiment of the present invention;

DESCRIPTION OF THE PREFERRED EMBODIMENTS

Figure 2B:
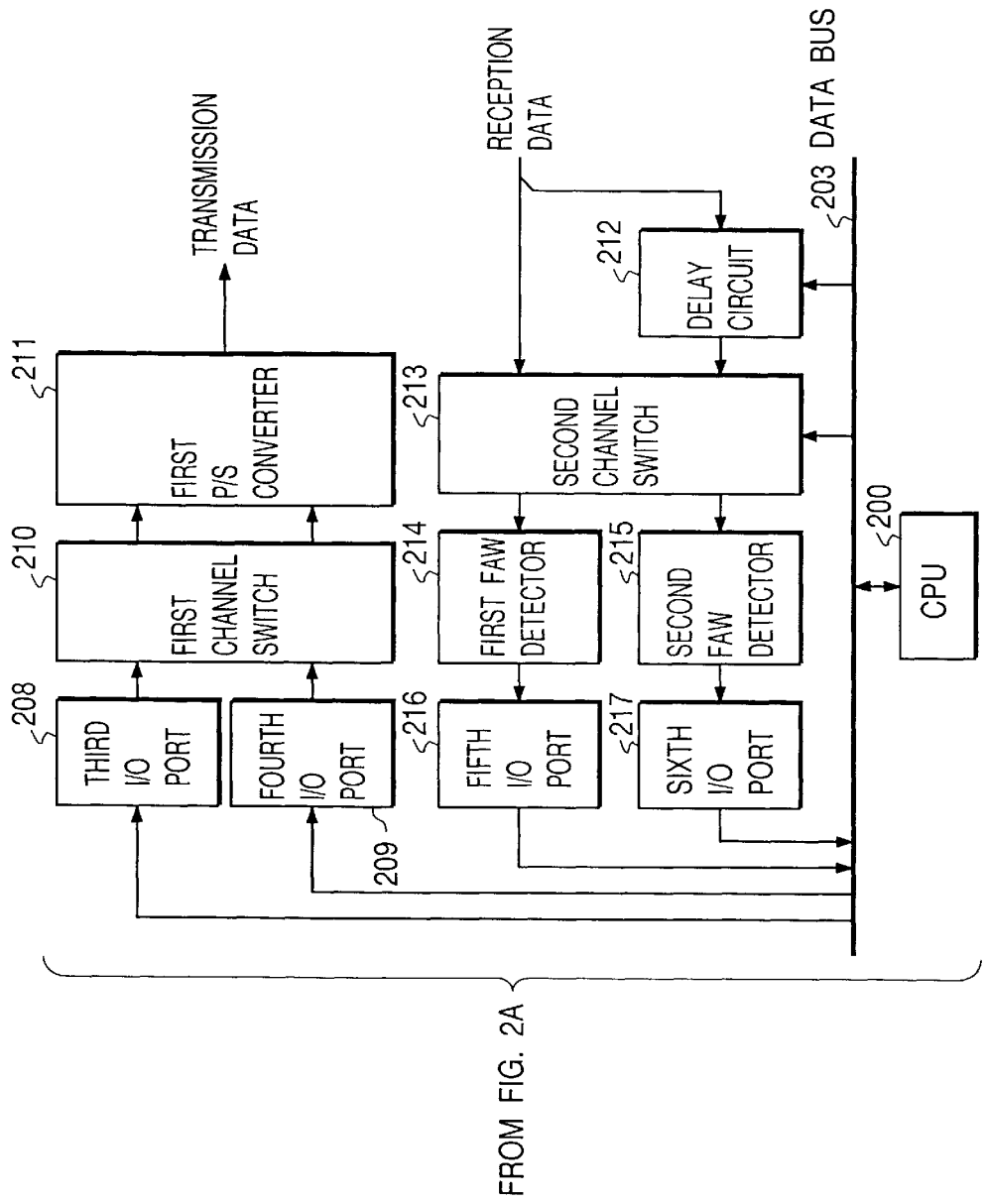
FIG. 2 which is composed of FIGS. 2A and 2B are block diagrams showing the configuration of a multiplexing unit, a demultiplexing unit and a turn-back unit in the above-mentioned apparatus.

Now, the present invention will be clarified in detail by preferred embodiments thereof, shown in the attached drawings.

[First embodiment]

FIG. 1 is a block diagram showing the configuration of a communication apparatus constituting a first embodiment, wherein shown are a camera 1 constituting video input means for entering an image to be transmitted; a microphone 2 constituting voice input means for entering voice to be transmitted; a video display unit 3 for displaying the received image; a speaker 4 constituting voice reproducing means for reproducing the received voice; an image encoding unit 5 for converting the transmission video signal into a predetermined communication data format; a voice encoding unit 6 for converting the transmission voice signal into a predetermined communication data format; first to fourth video decoding units 7–10 for decoding the received video data into video signals; first to fourth voice decoding units 11–14 for decoding the received voice communication data into voice signals; a display control unit 15 for arbitrarily selecting one or plural ones among the four video signals decoded in the first to fourth video decoding units 7–10 for display on the video display unit 3; and a voice signal control unit 16 for arbitrarily selecting one or plural ones among the four voice signals decoded in the first to fourth voice decoding units 11–14 and adding such voices for reproduction from the speaker 4.

There are also provided a multiplexing unit 17 for selecting the media to be transmitted to a partner and multiplexing these media into a predetermined format; a demultiplexing unit 18 for separating the communication data (reception data) received from a partner into respective media; a communication control unit (communication control means) 19 for controlling the connection of the communication line and the data transmission and reception to and from the communication line; first and second LSD communication control units 20, 21 for controlling the data communication among the terminals; an operation unit 22 such as a keyboard or a mouse by which the operator controls the present apparatus; an entire control unit 23 for controlling the entire operations of the present apparatus; a turnback bus (turnback means) 24 for turning back the data of arbitrary received media from the demultiplexing unit 18 to the multiplexing unit 17 for transmission with multiplexing with other new transmission data; and a communication line 25 composed of an ISDN basic interface (2B+D) in the present embodiment.

The video encoding unit 5 encodes the video signal according to the aforementioned ITU-TS recommendation H.261, for supply to the multiplexing unit 17. The ITU-TS recommendation H.261 defines a highly efficient adaptive video signal encoding based on three encoding methods, i.e. INTER (interframe encoding), INTRA (intraframe encoding) and MC (motion compensation), utilizing the interframe correlation of the video signal.

The encoding method of the ITU-TS recommendation H.261, being capable of adaptively controlling the data amount in the generated encoded data, is capable of encoding matching the arbitrary bit rate of the communication data. The first to fourth video decoding units 7–10 receive, from the demultiplexing unit 18, the reception data encoded according to the ITU-TS recommendation H.261 and decode these data into video signals.

The voice encoding unit 6 encodes the voice signal according to the ITU-TS recommendation G.711 or G.726, for supply to the multiplexing unit 17. The ITU-TS recommendation G.711 defines a PCM encoding method for converting a voice signal up to 4 kHz band into 8-bit digital data, with a generated data amount of 64 bit/sec. The ITU-TS recommendation G.726 defines an encoding method for compressing, by ADPCM, the data PCM encoded according to the recommendation H.711 and has four encoding modes with respective generated code amounts of 40k, 32k, 24k and 16k bit/sec.

The first to fourth voice decoding units 11–14 receive the reception data, encoded according to the aforementioned ITU-TS recommendation G.711 or G.726 and decode these data into voice signals.

The first and second LSD communication control units 20, 21 process the data communication function between the terminals executing communication. The present embodiment employs the HDLC communication protocol, which is already known and will not, therefore, be explained in detail. The data transfer rate of these units 20, 21 can be arbitrarily selected. The content of the data communication depends on the application of the present apparatus, and can be, for example, the data of a text file such as a document or the information on the connection of the communication line among the terminals.

The multiplexing unit 17 selects arbitrary media from the video encoding unit 5, voice encoding unit 6, and first and second LSD communication control units 20, 21 and multiplexes these media according to a predetermined multiplexing method. The demultiplexing unit 18 separates the received communication data into respective media, and assigns the obtained data to the first to fourth video decoding units 7–10, the first to fourth voice decoding units 11–14 and the first and second LSD communication control units 20, 21.

The turnback bus 24 from the demultiplexing unit 18 to the multiplexing unit 17 serves to turn back the received data of arbitrary media for new multiplexing and transmission in accordance with other transmission data and EH.221 format. Such multiplexing is executed by a method of assigning one or plural subchannels, shown in FIG. 18, to the data channel of arbitrary media, and such assignment is commonly set, prior to the communication, between the transmitting and receiving terminals.

Figure 9:
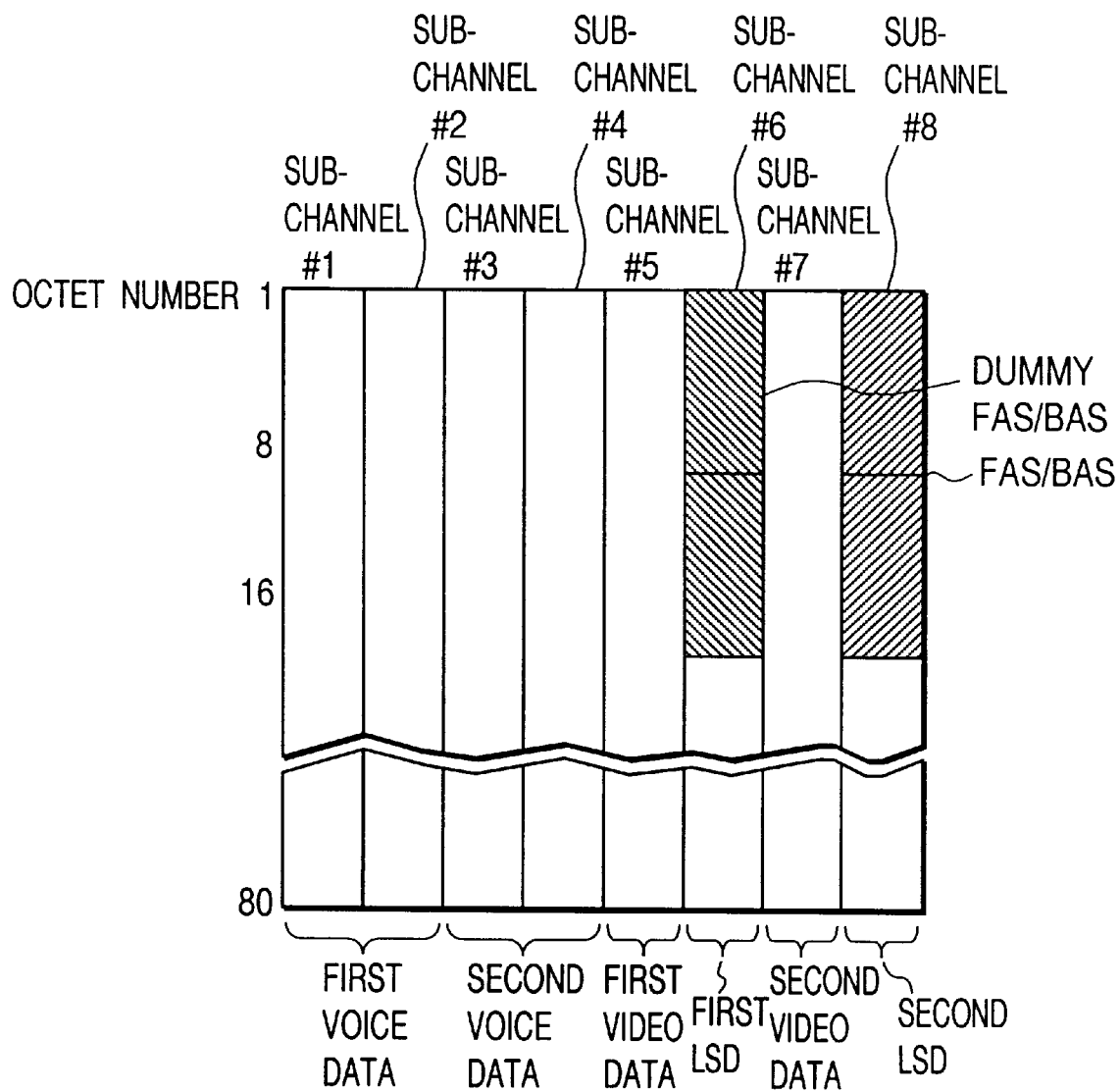
FIG. 9 is a view showing the FAS/BAS bit arrangement in the above-mentioned apparatus.

FIG. 9 shows an example of the subchannel assignment, wherein the subchannels #1 and #2 are assigned to first voice data, whole #3 and #4 are assigned to second voice data. Since data of 8 kbps are transmitted and received per subchannel, each of the first and second voice data are communicated with 16 kbps. The subchannels #5 is assigned to first video data, while #7 is assigned to second video data. Because of the assignment of one subchannel, each of the first and second video data has a data rate of 8 kbps. The subchannels #6 is assigned to first LSD from the first LSD communication control unit 20, while #8 is assigned to second LSD from the second LSD communication control unit 21, but, because of the dummy FAS/BAS assignment in the subchannel #6, the subchannels #6 and #8 have a same data rate of 6.4 kbps. The above-mentioned dummy assignment will be explained later.

The communication line control unit 19 executes the call setting control and the data transmission and reception control with a communication partner through the communication line 25. In the present embodiment, the communication line 25 is the ISDN basic interface (2B+D), which is composed of two logic communication lines of 64 kbps, called B channel, and a communication line of 16 kbps for call setting, called D channel. The B channel is used for data transmission and reception with the communication partner, and the D channel is used for communicating the call setting information between the terminal and the network. The communication line 25 transmits and receives the data trains serially with a bit rate of 192 kbit/sec. The communication line control unit 19 separates the data of two B channels from such data trains, and enters the data into the demultiplexing unit 18 with a data format with time-shared multiplexing for every 1 octet (8 bits). Also, the unit 19 transmits the time-shared multiplexed data of two B channels to the communication line 25.

Figure 10:
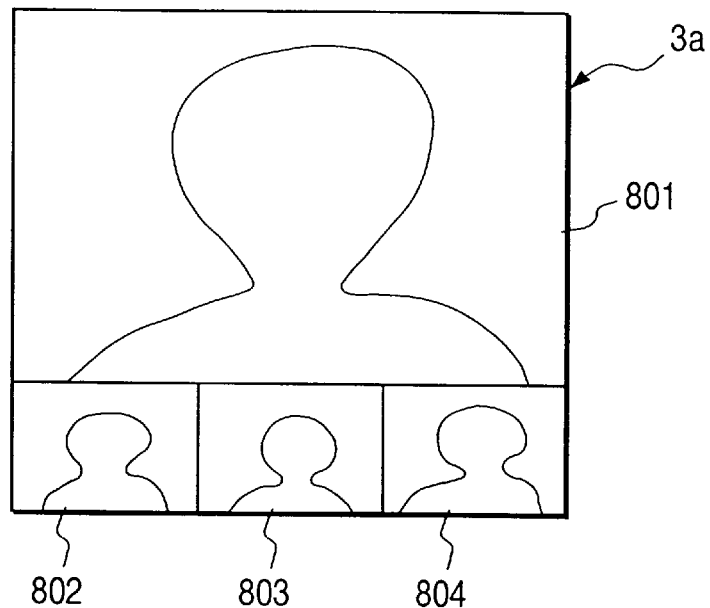
FIG. 10 is a view showing an example of the displayed image in a multi-location communication in the above-mentioned apparatus.

The display control unit 15 synthesizes the video signals from the first to fourth video decoding units 7–10 for display on the video display unit 3. FIG. 10 shows an example of the display. As shown in FIG. 10, the display image area 3a of the video display unit 3 is divided into first to fourth areas 801–804, wherein a first area 801 displays the image from the first video decoding unit 7, a second area 802 displays the image from the second video decoding unit 8, a third area 803 displays the image from the third video decoding unit 9, and a fourth area 804 displays the image from the fourth video decoding unit 10.

The voice signal control unit 16 synthesizes the voice signals from the first to fourth voice decoding units 11–14 for output from the speaker 4. The operation unit 22 is used by the operator for entering control information for controlling the functions of the present apparatus, and the entire control unit 23 controls the functions of the various function blocks according to the control information entered from the operation unit 22.

FIGS. 2A and 2B are detailed block diagrams of the multiplexing unit 17, the demultiplexing unit 18 and the turnback bus 24 shown in FIG. 1, wherein shown a CPU (central processing unit) 200 for controlling the functions of the multiplexing unit 17, the demultiplexing unit 18 and the turnback bus 24; a RAM (random access memory) 201 used as a work memory of the CPU 200 and for temporarily storing the reception data; a ROM (read-only memory) 202 storing the operation program of the CPU 200; and a data bus 203 for the CPU 200.

Figure 5:
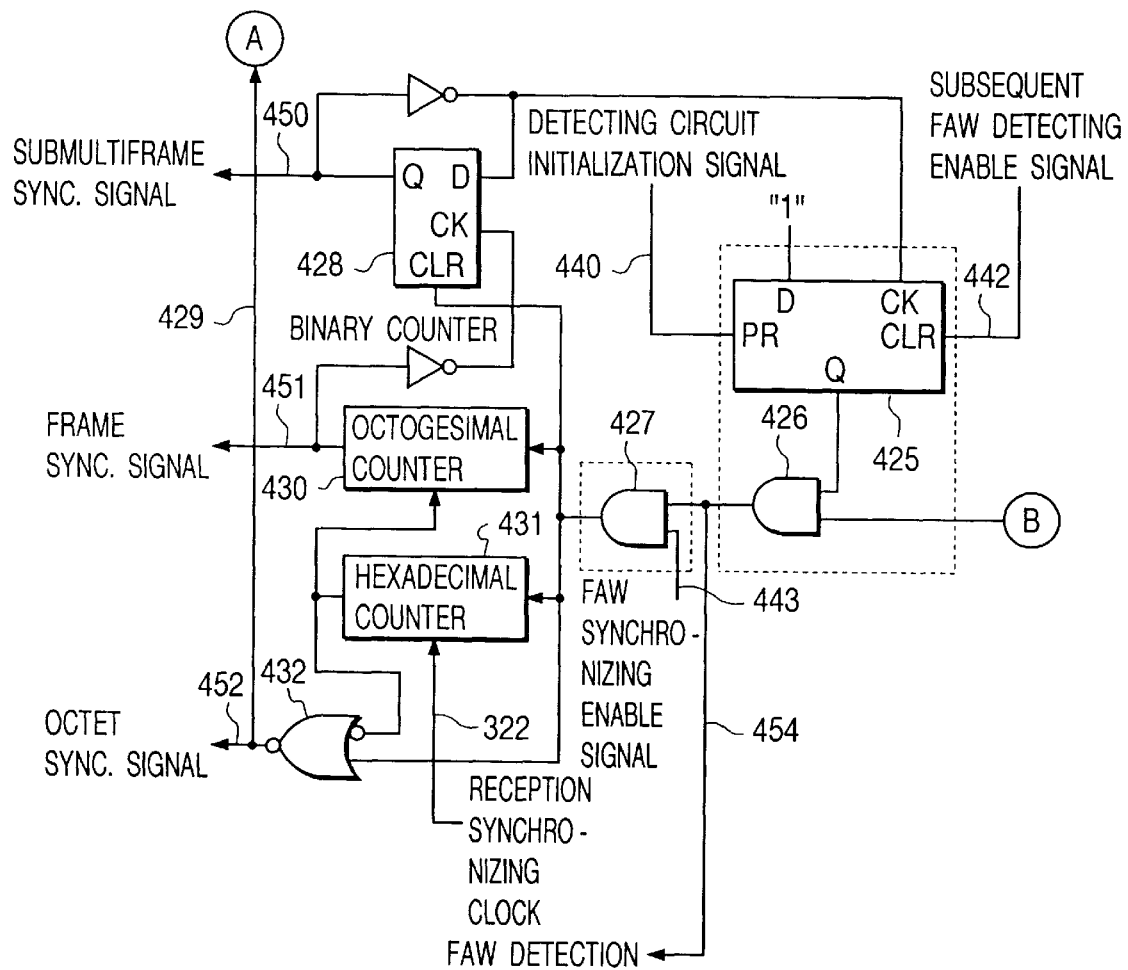

A serial/parallel (S/P) converter 204 converts various serial data trains, such as the transmission video data from the video encoding unit 5 shown in FIG. 5, the transmission voice data from the voice encoding unit 6 and the first and second transmission LSD from the first and second LSD communication control units 20, 21 into parallel data.

A slot distributor 205 assigns the media data and turnback data to arbitrary slots of the aforementioned subchannels.

First and second input/output (I/O) ports 206, 207 are used for fetching the transmission data from the slot distributor 205 into the CPU 200. Third and fourth I/O ports 208, 209 are used for sending the transmission data from the CPU 200 to a first channel switch 210.

The first channel switch 210 switches assignment of the transmission data of two kinds, respectively in the third and fourth I/O ports 208, 209, to the two B channels of the communication line control unit 19 shown in FIG. 1.

A first parallel/serial (P/S) converter 211 converts the parallel data from the first channel switch 210 into serial transmission data formed by multiplexing two B channel data.

A delay circuit 212 delays the received data train by an octet time. A second channel switch 213 switches the connection of the data of two kinds, namely the reception data and the data coming through the delay circuit 212, with first and second FAW detectors 214, 215, which detect, in the received data train, a frame synchronization signal FAW defined in the aforementioned ITU-TS recommendation H.221.

Fifth and sixth I/O ports 216, 217 are used for fetching the reception data by the CPU 200, in synchronization with the timing of FAW detected by the first and second FAW detectors 214, 215. Seventh and eighth I/O ports 218, 219 are used for sending the reception data to a second P/S converter 220 and a turnback port 221. The second P/S converter 220 converts the parallel data in the seventh and eighth I/O ports 218, 219 into serial data of respective function blocks, in the from of first and fourth reception video data to be supplied to the first to fourth video decoding units 7–10 shown in FIG. 1; first to fourth reception voice data to be supplied to the first to fourth voice decoding units 11–14 shown in FIG. 1; and first and second reception LSD to be supplied to the first and second LSD communication control units 20, 21.

The turnback port 221 selects, among the reception data in the seventh and eighth I/O ports 218, 219, the data to be turned back and sends such data to the slot distributor 205. The data turned back by the turnback bus 24 and the turnback port 221 are transmitted, with assignment to an arbitrary transmission subchannel.

Figure 11:
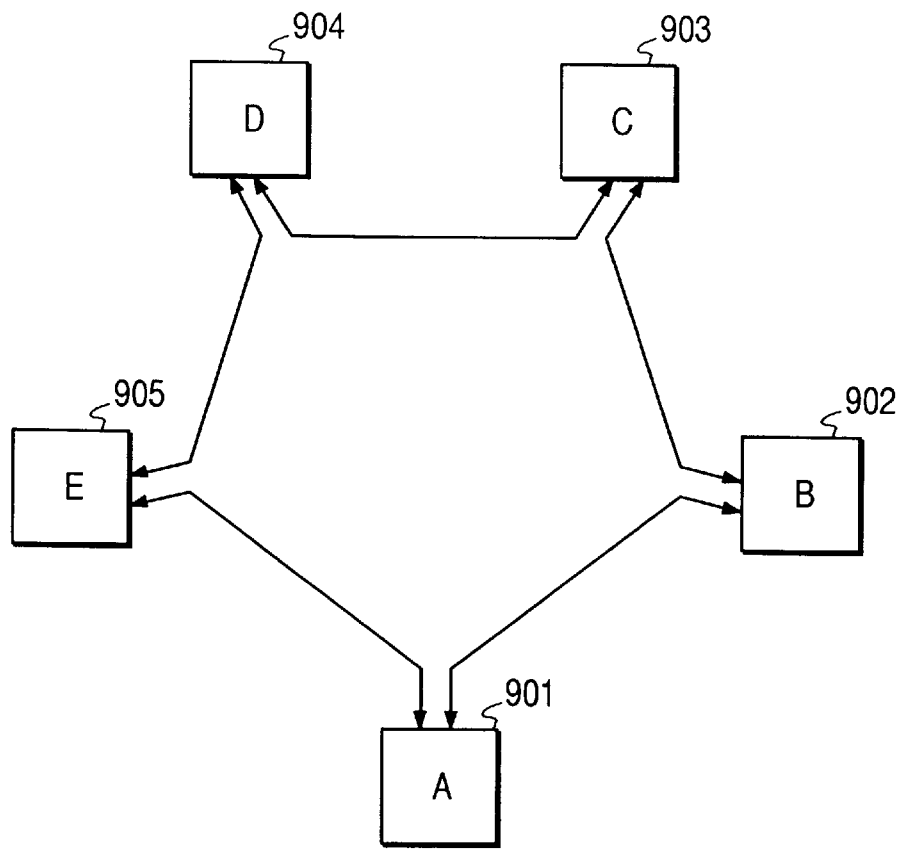
FIG. 11 is a view showing connections in the multi-location communication in the above-mentioned apparatus.

FIG. 11 shows an example of the concept of the turnback communication, wherein terminals A901, B902, C903, D904 and E905 are communication apparatus of the present embodiment, respectively positioned in different locations, and are mutually connected with B data channels of 64 kbps. In the basic ISDN interface, a channel interface contains two logic lines, called B channels, which are capable of setting calls with respectively different partners. In the A terminal 901, the two B channels are respectively connected with the B terminal 902 and the E terminal 905. The transmission video data, taken with the cameras 1, shown in FIG. 1, of the terminals 901–905 are respectively indicated by Va, Vb, Vc, Vd and Ve, and the transmission voice or audio data, taken with the microphones 2, shown in FIG. 1, of the terminals 901–905 are respectively indicated by Aa, Ab, Ac, Ad and Ae.

Figure 12A:
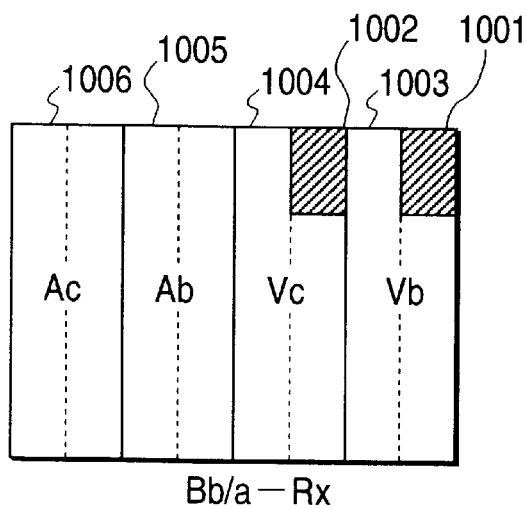
FIGS. 12A to 12D are views showing the frame structure in the multi-location communication in the above-mentioned apparatus.
Figure 12B:
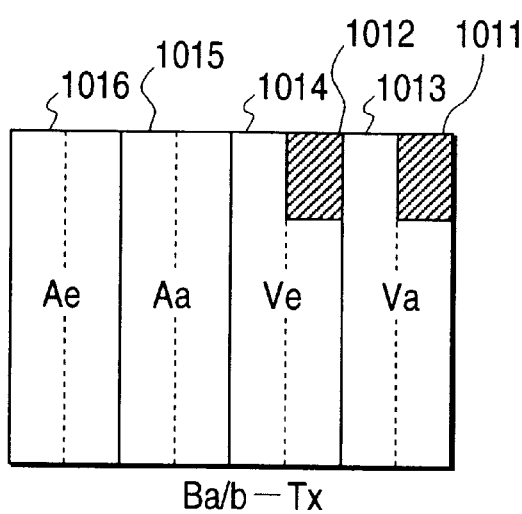
Figure 12C:
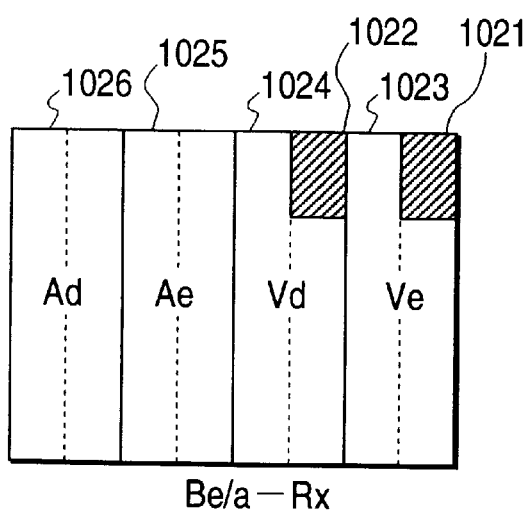
Figure 12D:
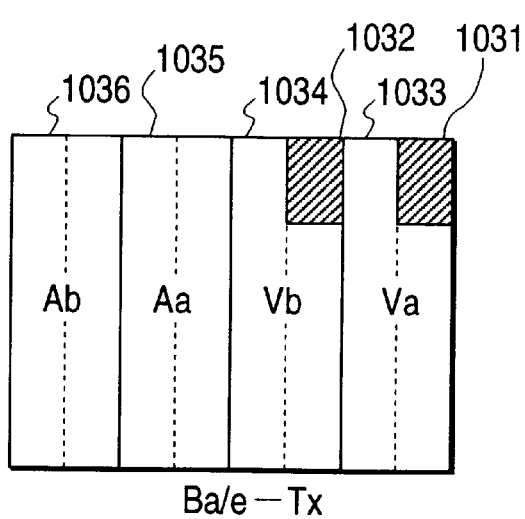

FIGS. 12A to 12D show the frame structures of the communication data transmitted and received in the B channels of the A terminal 901. FIG. 12A shows a structure Bb/a-Rx of the reception B channel received by the A terminal 901 from the B terminal 902; FIG. 12B shows a structure Ba/b-Tx of the transmission B channel transmitted by the A terminal 901 to the B terminal 902; FIG. 12C shows a structure Be/a-Rx of the reception B channel received by the A terminal 901 from the E terminal 905; and FIG. 12D shows a structure Ba/e-Tx of the transmission B channel transmitted by the A terminal 901 to the E terminal 905. Each channel has 8 subchannels and has a data rate of 64 kbps in total.

In these drawings, there are shown FAS/BAS 1001, 1011, 1021, 1031 and dummy FAS/BAS 1002, 1012, 1022, 1032. The dummy FAS/BAS 1002, 1012, 1022, 1032 have vacant bits of a number same as the bit number of the FAS/BAS 1001, 1011, 1021, 1031, and no data are inserted into these vacant bits.

In the channel Bb/a-Rx shown in FIG. 12A, the voice data Ac (1006) of the C terminal 903 are assigned to the subchannels #1 and #2; the voice data Ab (1005) of the B terminal 902 are assigned to #3 and #4; the video data Vc (1004) of the C terminal 903 to #5 and #6; and the video data Vb (1001) of the B terminal 902 to #7 and #8, and accordingly received.

In the channel Be/a-Rx shown in FIG. 12C, the voice data Ad (1026) of the D terminal 904 are assigned to the subchannels #1 and #2; the voice data Ae (1025) of the E terminal 905 are assigned to #3 and #4; the video data Vd (1024) of the D terminal 904 to #5 and #6; and the video data Ve (1021) of the E terminal 905 to #7 and #8, and accordingly received.

In the channel Ba/b-Tx shown in FIG. 12B, at first the transmission video data Va (1013) of the A terminal 901, constituting the self terminal, are assigned to the subchannels #7 and #8, and the transmission voice data Aa (1015) of the A terminal 901 are assigned to the subchannels #3 and #4, and they are accordingly transmitted. Also within the data received from the E terminal 905, which is opposite to the B terminal 902 constituting the destination terminal, the video data Ve (1025) and the voice data Ae (1023) of the E terminal 905 are turned back by assignment to the transmission video data Ve (1014) of the subchannels #5 and #6 and to the transmission voice data Ae (1016) of the subchannels #1 and #2 and are thus transmitted.

In the channel Ba/e-Tx shown in FIG. 12D, at first the transmission video data Va (1033) of the A terminal 901, constituting the self terminal, are assigned to the subchannels #7 and #8, and the transmission voice data Aa (1035) of the A terminal 901 are assigned to the subchannels #3 and #4, and they are accordingly transmitted. Also, within the data received from the B terminal 902, which is opposite to the E terminal 905 constituting the destination terminal, the video data Vb (1001) and the voice data Ab (1005) of the B terminal 902 are turned back by assignment to the transmission video data Vb (1032) of the subchannels #5 and #6 and to the transmission voice data Ab (1036) of the subchannels #1 and #2 and are thus transmitted.

In this manner the A terminal 901 turns back, among the data of the C terminal 903 and the B terminal 902 received from the B terminal 902, only the data of the adjacent B terminal 902, and transmits such turn-back data by multiplexing with the data of the self A terminal 901 to the E terminal 905 on the opposite side, and, among the data of the D terminal 904 and the E terminal 905 received from the E terminal 905, only the data of the adjacent E terminal 905 by multiplexing with the data of the self A terminal 901 to the B terminal 902 on the opposite side.

In such turn back operation, the assignment of the subchannels is changed in such a manner that the data of the adjacent terminal are always assigned to the subchannels #3, #4, #7 and #8, so that the continued circulation of the data can be avoided. For example, the turn-back operation for the transmission data of the A terminal 901 is terminated when such data are transmitted through the B terminal 902 to the C terminal 903 or when such data are transmitted through the E terminal 905 to the D terminal 904. The data turn-back operation is conducted in the same manner in all of the B to E terminals 902–905, whereby each terminal can receive the voice and video data from all the terminals.

Now, there will be explained the aforementioned dummy FAS/BAS 1002, 1012, 1022, 1032. Since FAS and BAS are signals for setting the frame synchronization and the communicating ability between the mutually communicating terminal, such FAS and BAS between the mutually communicating terminals need not be turned back to the communication between different terminals.

However, in FIG. 12A, if the reception video data Ve (1023) are turned back to the transmission video data Ve (1014) without the FAS/BAS in the subchannel #8, there are generated vacant bits in the subchannel #6 corresponding to the position of FAS/BAS, because all the subchannels have a same data amount. Consequently, such vacant bit positions are defined in advance as dummy FAS/BAS position, and the data therein are disregarded at the reception. FIGS. 12A and 12C show such dummy FAS/BAS (1002, 1022) in the subchannels #6 in the reception data, and the receiving terminal disregards the data in these bit positions.

Figure 3:
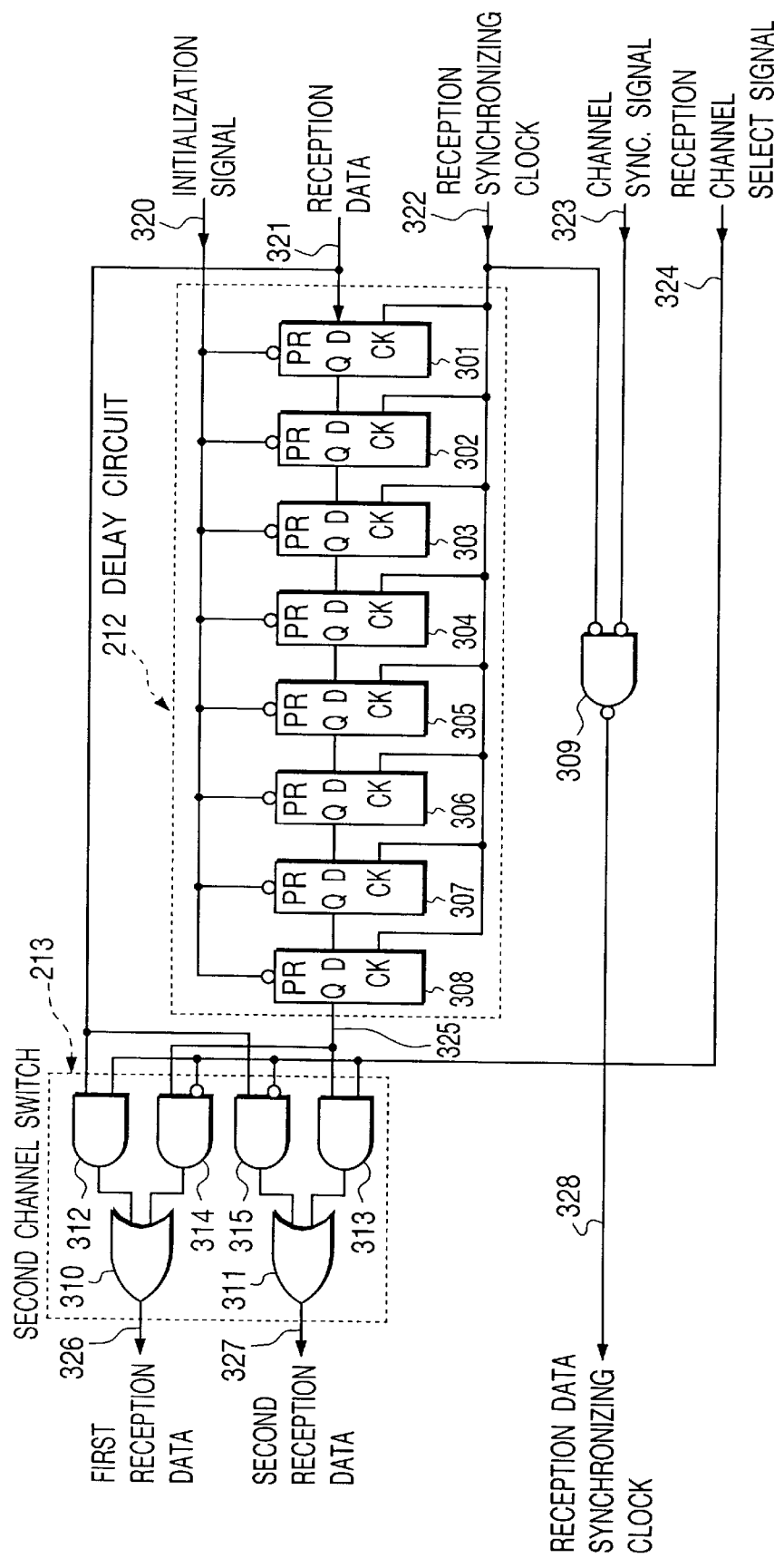
FIG. 3 is a block diagram showing the circuit configuration of a delay circuit and a channel switch in the above-mentioned apparatus.

FIG. 3 is a detailed block diagram around the delay circuit 212 and the second channel switch 213 shown in FIG. 2B. In FIG. 3, there are shown first to eighth flip-flops 301–308; first to fifth AND gates 309, 312–315; and first and second OR gates 310, 311. Circles attached to the input/output terminals of the gates-indicate negative logic input/output.

An initialization signal 320 is used for initializing the delay circuit 212 by the CPU 200, shown in FIG. 2B, prior to the start of communication, and initializes the first to eighth flip-flops 301–308 to the H-level.

Reception data 321 are supplied from the communication line control unit 19 shown in FIG. 1, and contain the data of two B channels subjected to time-shaped multiplexing in the unit of an octet.

A synchronization clock 322 (reception synchronization clock) of the reception data has a frequency of 128 kHz in the present embodiment. A channel synchronization signal 323 indicates whether the time-shared multiplexed reception data 321 are of the data of the B1 channel or those the B2 channel.

A reception channel selection signal 324 is controlled by the CPU 200 and is used for determining the connection of the B1 and B2 channels to the first and second FAW detectors 214, 215.

Figure 13:
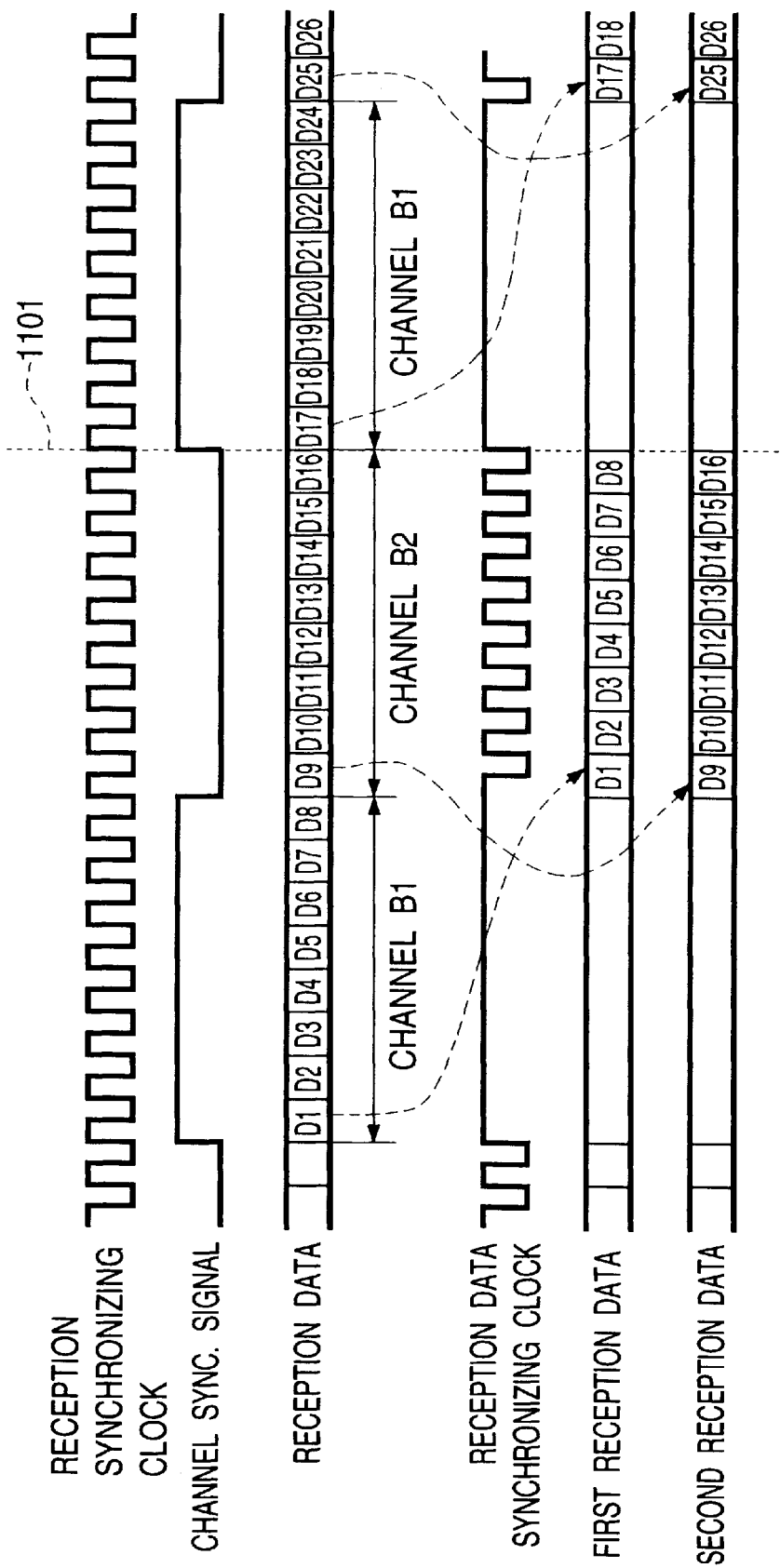
FIG. 13 is a timing chart showing the function timing of the delay circuit and the channel switching circuit in the above-mentioned apparatus.

FIG. 13 shows the function timing of the delay circuit 212 and the second channel switch 213 when the reception channel selection signal 324 is at the H-level state.

The delay circuit 212 buffers the reception data in succession in synchronization with the eight reception synchronization clocks 322, thereby generating delayed data 325 which are delayed by an octet from the reception data 321.

When the reception channel signal is at the H-level state, the reception data 321 are supplied through the second AND gate 312 and the first OR gate 310 to the first FAW detector 214 shown in FIG. 2B as the first reception data 326, and the delayed data 325 are supplied through the third AND gate 313 and the second OR gate 311 to the second FAW detector 215 as the second reception data 327. The reception synchronization clock 322 is gated by in the first AND gate 309 by the channel synchronization signal, thereby generating a reception data synchronization clock 328. The reception data synchronization clock 328 is composed of skipped clock pulses as shown in FIG. 13, and is supplied to the first and second FAW detectors 214, 215, as the data synchronization clock for the first and second reception data 326, 327.

When the reception channel signal is at the L-level state, the reception data 321 are supplied through the fifth AND gate 315 and the second OR gate 311 to the second FAW detector 215 shown in FIG. 2B as the second reception data 327, and the delayed data 325 are supplied through the fourth AND gate 314 and the first OR gate 310 to the first FAW detector 214 as the first reception data 326. The reception data synchronization clock 328 is the same as explained above.

Figure 4:
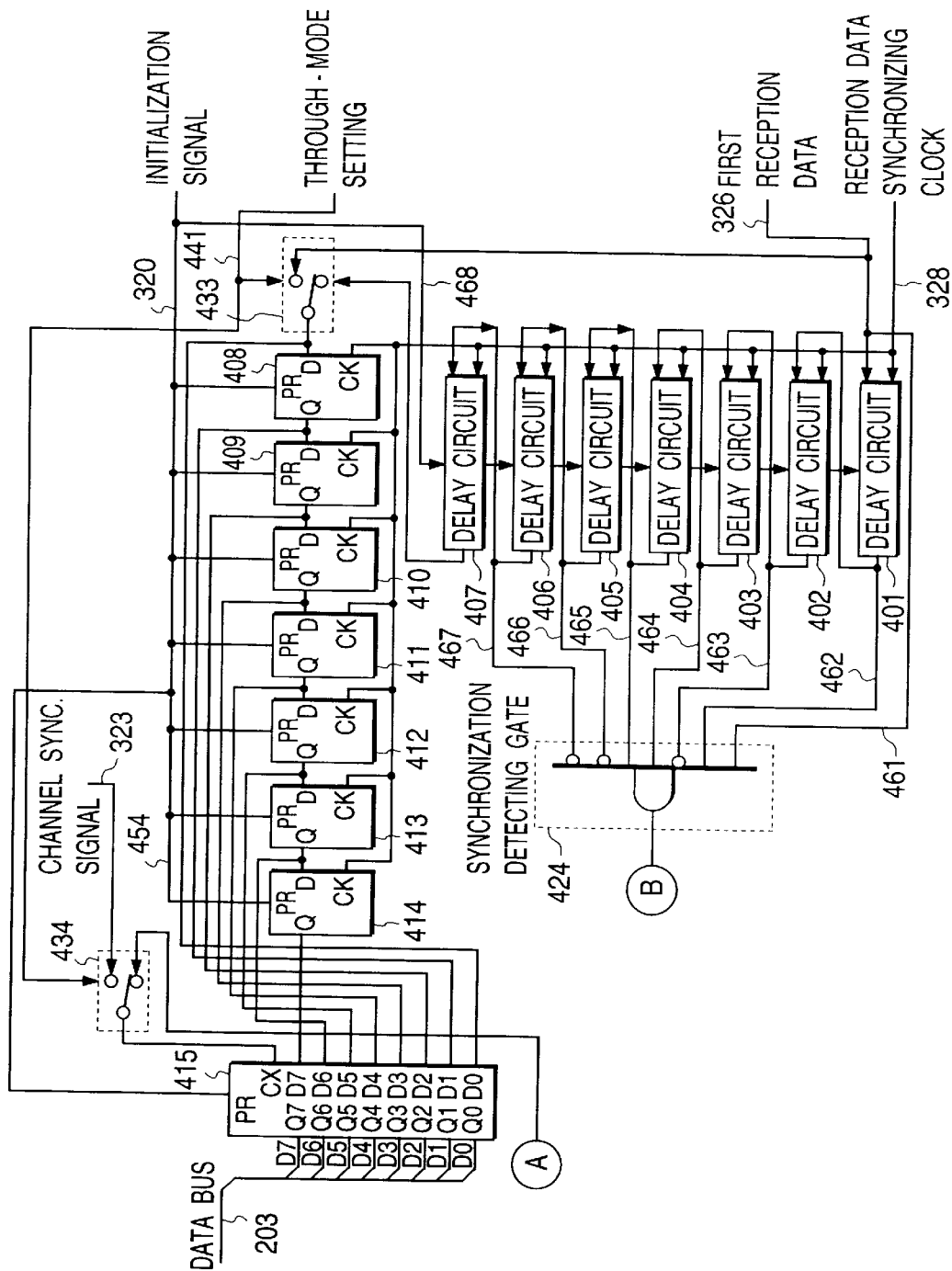
FIGS. 4 and 5 are block diagrams showing the circuit configuration of an FAW detector in the above-mentioned apparatus.

FIGS. 4 and 5 are detailed block diagrams of the first FAW detector 214 shown in FIG. 2B. Since the first and second FAW detectors 214 and 215 are identical in structure, FIGS. 4 and 5 show only one of these detectors.

Referring to FIGS. 4 and 5, there are shown first to seventh delay circuits 401–407 having a same structure as that of the delay circuit 212 shown in FIG. 2B; first to seventh D-flip-flops 408–414; an 8-bit register 415; a synchronization detection gate 424 for releasing an H-level signal upon detecting "0011011" constituting a part of the FAW synchronization pattern; an eighth D-flip-flop 425 capable presetting and resetting; first and second AND gates 426, 427; a binary counter 428; an octogesimal counter 430; a hexadecimal counter 431; an OR gate 432; first and second switch circuits 433, 434; and a detection circuit initializing signal 440 for initializing the first FAW detection circuit 214 by the CPU 200 prior to the start of communication.

A next FAW detection enabling signal 442 is a control signal, controlled by the CPU 200, for starting the FAW search by the first FAW detection circuit 214.

A through-mode setting signal 441 is used, by the CPU 200, for setting whether or not the reception data bypasses the first FAW detector 214.

At first, there will be explained a case where the data of the B1 channel are selected for bypassing the first FAW detector 214. For selecting the B1 channel, the reception channel selection signals 324 assumes the L-level state. Consequently, the data 325 through the delay circuit 212 are obtained from the first reception data 326 shown in FIG. 3. When the through-mode setting signal 441 sets the bypassing of the FAW detector, the first and second switches 433, 434 are switched respectively to the first reception data 326 and the channel synchronization signal 323. Consequently, the first reception data 326 are connected to the first D-flip-flop 408 through the first switch 433, and are entered in succession to the first to seventh D-flip-flops 408–414 in synchronization with the reception data synchronization clock 328.

At a timing behind the bit D8 in FIG. 13, the first reception data 326 are directly connected and entered into the D0 input of the register 415. Also, the output of the first-flip-flop 408, representing the data entered prior to the first reception data 326 by a cycle, are connected to and entered in the D1 input of the register 415. Similarly, the data of the second to seventh D-flip-flops 409–414, representing the data of the successively preceding cycles, are entered into the D2–D7 inputs of the register 415.

Thus, the first FAW detector 214 converts the serial data D1–D8 shown in FIG. 13 into parallel data, and stores such parallel data in the register 415 at a timing 1101. Then, the serial data D17–D24 are converted into parallel data and stored in the register 415. In this manner, the data of the B1 channel alone are subjected to serial/parallel conversion by the S/P converter 204 and stored in the register 415.

In case of selecting the data of the B2 channel for bypassing the first FAW detector 214, the reception channel selection signal 324 assumes the H-level state. Consequently, the reception data 321 are obtained from the first reception data 326 shown in FIG. 3. In this case, the data train indicated as the second reception data in FIG. 13 is released as the first reception data 326. In the same manner, as explained in the foregoing, the data are stored in the register 415 at the timing 1101 shown in FIG. 13.

In the following, there will be explained the function in case of selecting the data of the B1 channel and not bypassing the first FAW detector 214.

The detection circuit initializing signal 440 shown in FIGS. 4 and 5 is a signal controlled by the CPU 200 and used for initializing the first FAW detector 214 prior to the start of communication. The FAW detection enabling signal 442 is a signal controlled by the CPU 200 and is used, at the FAW detection, for clearing the output of the eighth D-flip-flop 425 to the L-level state prior to the detection, thereby closing the first AND gate 426, and starting the FAW detection again after the lapse of a period of the sub-multi frame currently under processing.

The FAW detection is executed at the start of communication, and the FAW detection in the data bit train is executed again in the course of communication, in order to re-establish the frame synchronization, in case the FAW bit pattern cannot be found in the predetermined position because of certain data error and the frame synchronization according to the recommendation H.221 is identified lost.

The FAW synchronization enabling signal 443 is a signal controlled by the CPU 200, whether or not to validate the initialization of the frame synchronization signal generating circuit of the first FAW detector 214 by the FAW detection.

Figure 14:
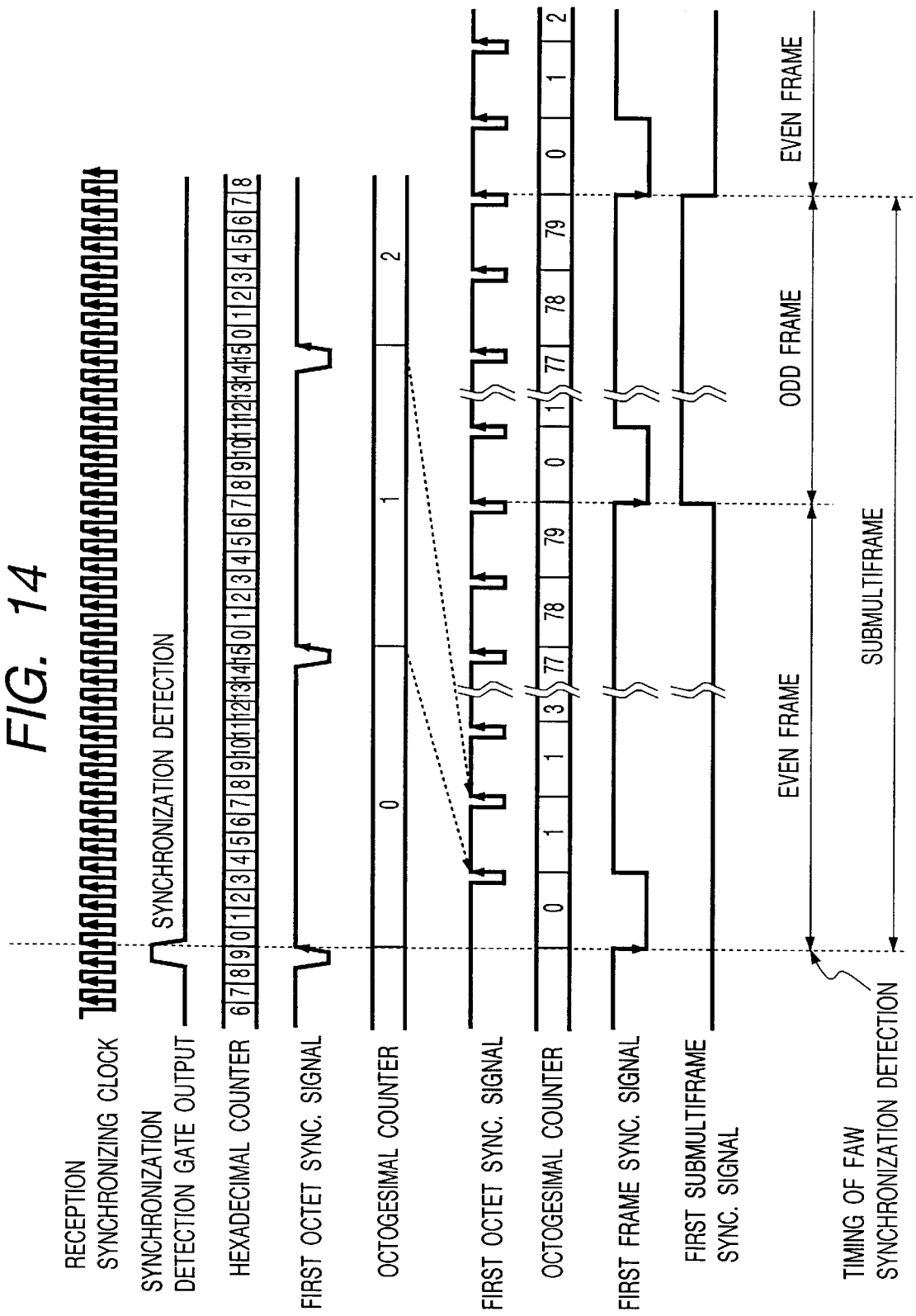
FIG. 14 is a timing chart showing the function timing of a hexadecimal counter, an octogesimal counter and a binary counter in the above-mentioned apparatus.

The frame synchronization signal generation circuit is composed of a hexadecimal counter 431 for generating an octet synchronization signal 452, an octogesimal counter 430 for generating a frame synchronization signal 451, and a binary counter 428 for generating a sub-multi frame synchronization signal 450. The hexadecimal counter 431 effects upcounting in synchronization with the reception synchronization clock 322, is initialized to 0 by the output signal of the second AND gate 427, and supplies the OR gate 432 and the octogesimal counter 430 with an L-level signal when the count is 0. The octogesimal counter 430 is initialized to 0 by the output signal of the second AND gate 427, effects upcounting in synchronization with the output of the hexadecimal counter 431, and sends an L-level signal to the binary counter 428 through an inverter at the initial count state, namely at a count 0. The binary counter 428 is initialized to 0 by the output signal of the second AND gate 427, and repeats the L- and H-level outputs in synchronization with the output of the octogesimal counter 430. The operations of these counters are shown in FIG. 14.

The first reception data 326 and the reception data synchronization clock 328, released from the second channel switch 213 shown in FIG. 2B, are supplied to a first delay circuit 401 and to a synchronization detection gate 424. The reception data 467, delayed by an octet in the first delay circuit 404, are supplied to a next second delay circuit 402 and the synchronization detection gate 424. The reception data 463, delayed by another octet in the second delay circuit 402 or by two octets in total, are supplied to a next third delay circuit 403 and the synchronization detection gate 424.

Similarly, the reception data 464, delayed by an octet in the third delay circuit 403 or by 3 octets in total, are supplied to a next fourth delay circuit 404 and the synchronization detection gate 424. The reception data 465, delayed by an octet in the fourth delay circuit 404 or by 4 octets in total, are supplied to a next fifth delay circuit 405 and the synchronization detection gate 424. The reception data 466, delayed by an octet in the fifth delay circuit 405 or by 5 octets in total, are supplied to a next sixth delay circuit 406 and the synchronization detection gate 424. The reception data 467, delayed by an octet in the sixth delay circuit 406 or by 6 octets in total, are supplied to a next seventh delay circuit 407 and the synchronization detection gate 424. The reception data 468, delayed by an octet in the seventh delay circuit 407 or by 7 octets in total, are supplied to the first D-flip-flop 408 through the first switch 433. Consequently, the synchronization detection gate 424 receives in succession 7 bits, respectively separated by an octet, from the serial data train.

Again, referring to the frame structure according to the ITU-TS recommendation H.221, the odd frame and even frame constitute a sub-multi frame. The even frame contains a synchronization bit pattern "0011011" constituting a part of the FAW signal, always in the FAS position in the second to eighth octet positions, for attaining frame synchronization. Stated differently, the serial data train contains a bit pattern "0011011" at an interval of an octet.

Consequently, an even frame can be detected by monitoring the synchronization pattern "0011011" of an interval of an octet in the serial data train, and can be regarded to start from a fifteenth bit preceding the initial bit at the start of detection. The synchronization detection gate 424 serves to detect such pattern "0011011" and releases an H-level signal upon detection. In this state, the Q output of the seventh D-flip-flop 414 corresponds to the initial bit data of a frame, and the register 415 has received the data of the first octet of the frame.

In the initial state at the start of communication, the eighth D-flip-flop 425 releases an H-level output and the first AND gate 426 is turned on. Consequently, when the synchronization detection gate 424 detects the bit pattern "0011011" after the FAW synchronization enable signal 443 is rendered effective, the hexadecimal counter 431, the octogesimal counter 430 and the binary counter 428 are initialized. The FAW detection timing, shown by a broken line in FIG. 14 corresponds to the timing of initialization of these counters.

Once, the frame synchronization is established by the FAW detection, the first reception data 326 are shifted in succession in the first to seventh delay circuits 401–407 and the first to seventh D-flip-flops 408–414, whereby the octet data of the frame structure are written in the register 415 in synchronization with the octet synchronization signal 452.

Figure 15:
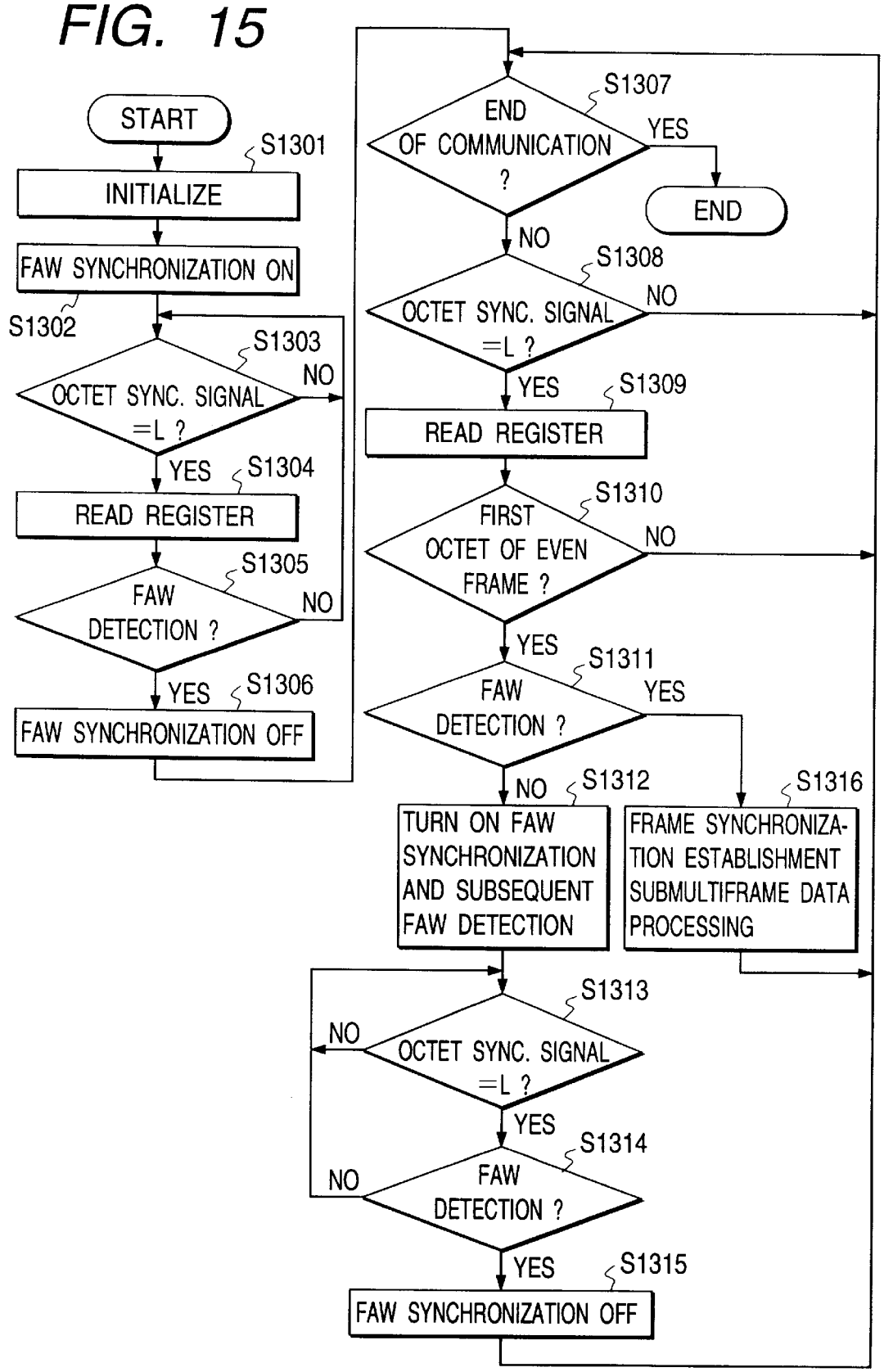
FIG. 15 is a flow chart showing the control sequence of the FAW detector in the above-mentioned apparatus.

Now, the control sequence of the first FAW detector 214 will be explained with reference to a flow chart shown in FIG. 15. At first in a step S1301 the CPU 200 initializes the first FAW detector 214, prior to the start of communication. In this initializing step S1301, the CPU 200 controls the initialization signal 320 and the detection circuit process signal 440 to set the eighth D-flip-flop 1425 at the H-level state. Before the L-level state is assumed, the sequence proceeds to a step S1302 in which the CPU 200 controls the FAW synchronization enable signal 443 and turns on the second AND gate 427, for enabling the FAW synchronization detection function. Then, in a step S1303, the CPU 200 discriminates whether the octet synchronization signal 452 has assumed the L-level state, until such L-level state is assumed. When the L-level state is realized, the CPU 200 in a step S1304 reads the data of the register 415 at the timing of octet and transfers the data to the RAM 201.

Then, in a next step S1305, the CPU 200 discriminates whether the FAW detection signal 454 has been detected, and, if not, the CPU 200 identifies that the frame synchronization is not established and the sequence returns to the step S1303. If the frame synchronization is established by the FAW detection, the sequence proceeds to a step S1306 in which the hexadecimal counter 431, the octogesimal counter 430 and the binary counter 428 are initialized to 0. Upon FAW detection, the CPU 200 turns off the FAW synchronization enable signal 443 and inhibits the initialization of the hexadecimal counter 431, the octogesimal counter 430 and the binary counter 428.

Then, a step S1307 discriminates whether the communication is terminated, and, if terminated, the present sequence is terminated. If not, the sequence proceeds to a next step S1308 in which the CPU 200 discriminates whether the octet synchronization signal 452 has reached the L-level state, and, if not, the sequence returns to the step S1307. In the meantime, the first FAW detector 214 converts the serial data into the parallel data in the octet unit.

If the octet synchronization signal 452 assumes the L-level state in the above-mentioned step S1308, the CPU 200 in a next step S1309 reads the data of the register 415 and transfers the data to the RAM 201.

Then, in a next step S1310, the CPU 200 discriminates whether data, read in the step S1309, are the first octet data of an even frame. This discrimination is made, based on the sub-multi frame synchronization signal 450 and the frame synchronization signal 451, by detecting whether the sub-multi frame synchronization signal 450 is in the L-level state indicating the even frame and whether the frame synchronization signal 451 is in the L-level state indicating the first octet data. If these two conditions are not satisfied, namely if the data in question are not the first octet data of the even frame, the sequence returns to the step S1307.

If these two conditions are satisfied, the CPU 200 identifies that the first octet data of the even frame have been read, and, in a next step S1311, discriminates whether the FAW detection signal 454 has been detected. If detected, a step S1316 processes the data, read from the register 415, as those of a sub-multi frame, and then the sequence returns to the step S1307.

If the FAW is detected in the above-mentioned step S1311 at the timing of the first octet of the even frame in the step S1310, the frame synchronization is considered as lost, and, in a next step S1312, the CPU 200 turns on the next FAW detection enable signal 442 and the FAW synchronization enable signal 443 for detecting the next FAW. Then, in a next step S1313, the CPU 200 discriminates whether the octet synchronization signal 452 has assumed the L-level state, until such L-level state is reached, and, when the L-level state is reached, the CPU discriminates in a next step S1314 whether the FAW detection signal 454 has been detected. If not, the sequence returns to the step S1313, but, if detected, the frame synchronization is identified as re-established, and the CPU 200 in a next step S1315 turns off the FAW synchronization enable signal 443 and the sequence returns to the aforementioned step S1307. The sequence explained above is repeated until the communication is terminated.

Figure 16:
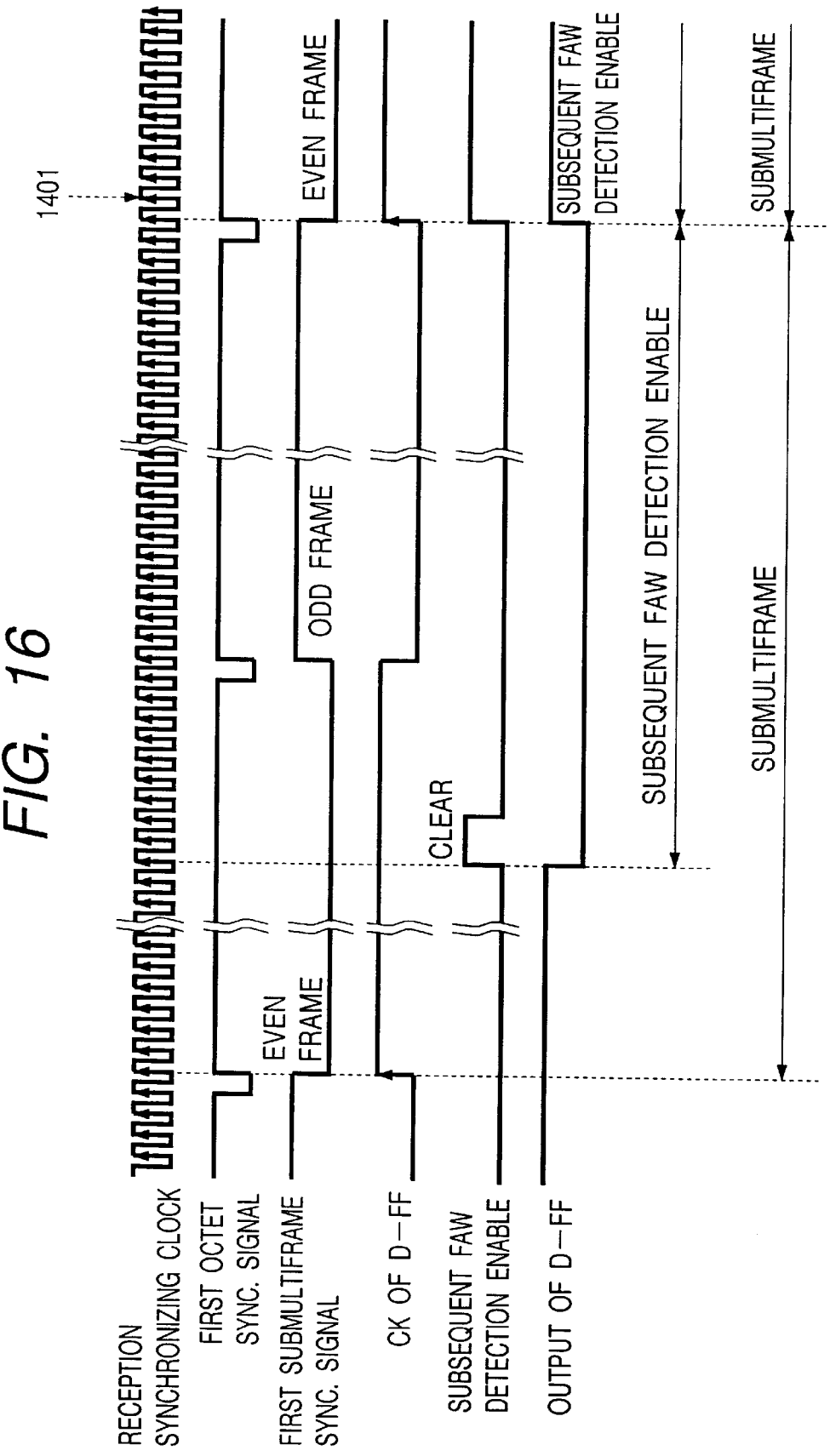
FIG. 16 is a timing chart showing the function timing of the FAW detection by the FAW detector in the above-mentioned apparatus.
Figure 18:
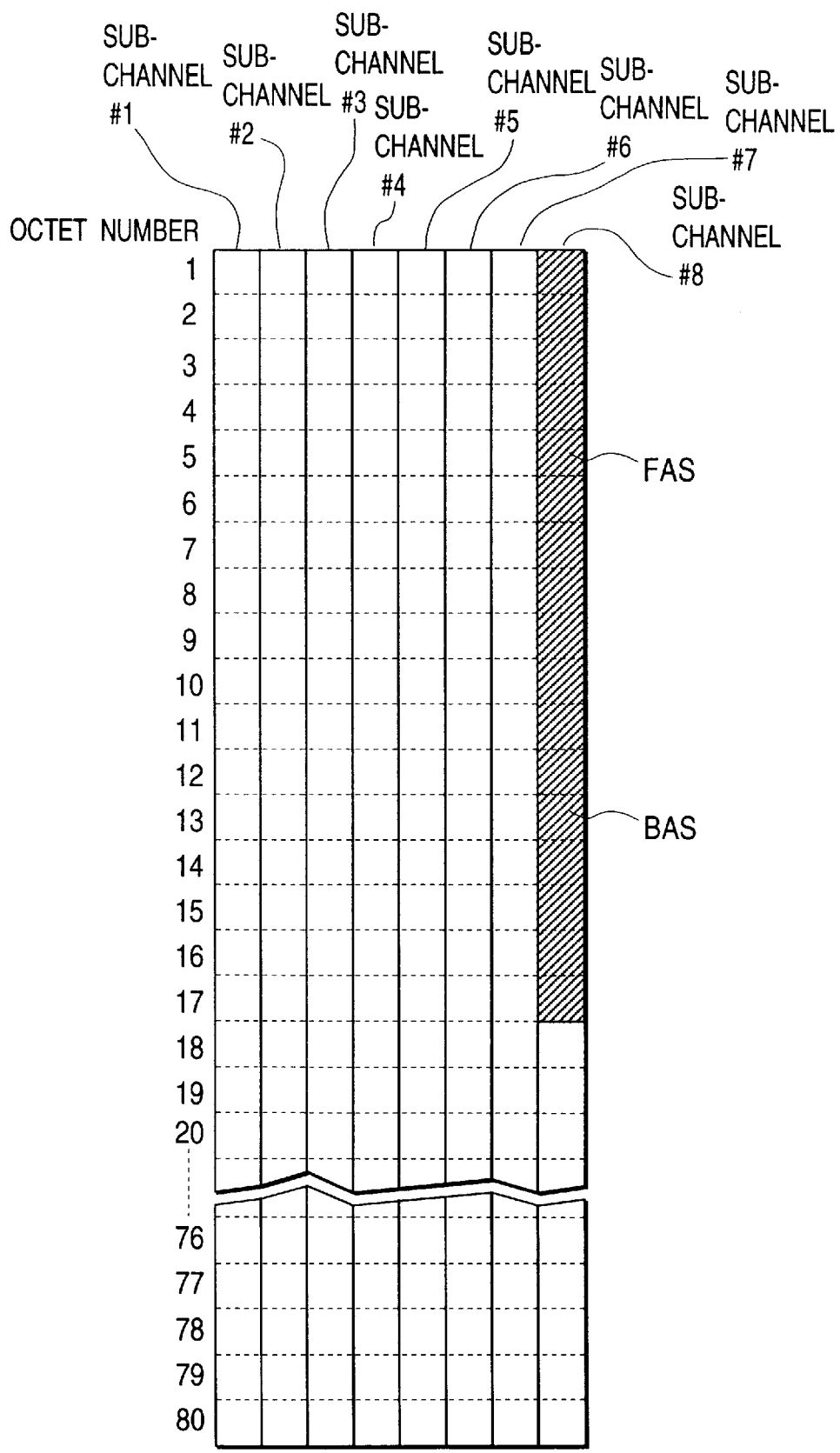
FIG. 18 is a view showing the frame structure defined by the ITU-TS recommendation H.221.
Figure 19A:
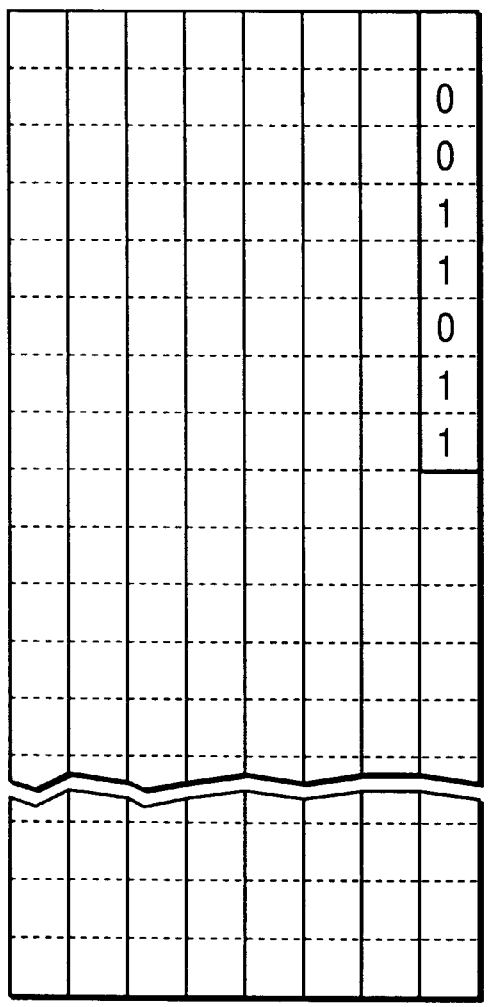
FIGS. 19A and 19B are views showing the bit arrangement of the FAW synchronization word.
Figure 19B:
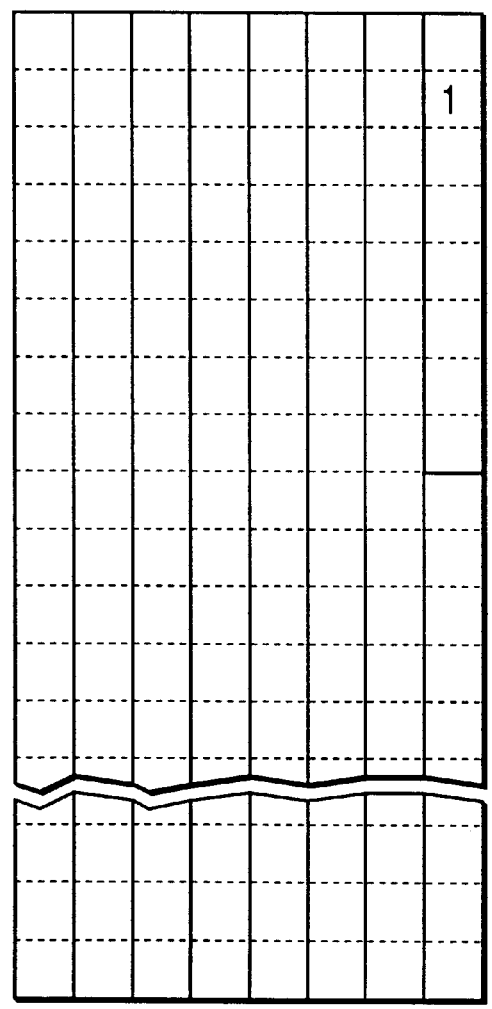

FIG. 16 is a timing chart showing the function timing of the eighth D-flip-flop 425 at the FAW detection explained above. In FIG. 18, CK of D-FF indicates the clock input to the eighth D-flip-flop 425, functioning at the timing of the upshift edge.

As shown in FIG. 16, the eighth D-flip-flop 425 is cleared by the H-level state of the next FAW detection enable signal 442, and the first AND gate 426 for FAW detection is turned off until the start of a next even frame, or of a sub-multi frame.

When the first AND gate 426 is turned on at the start of the sub-multi frame, the reception data supplied to the FAW synchronization detection gate 424 are the first reception data 326 and the outputs of the first to sixth delay circuits 401–406 shown in FIGS. 4 and 5, and such data are fetched into the first to seventh delay circuits 401–407 at the timing of a second clock from the start of the sub-multi frame, namely at a clock timing 1401 shown in FIG. 16. Stated differently, the FAW search is started from a bit position delayed by a cycle from the start of the sub-multi frame. Consequently the search of the FAW synchronization signal pattern is started from a bit position, later by a clock than the conventional timing of detection.

The structure and function of the second FAW detector 215 are same as those of the first FAW detector 214. The first and second FAW detectors 214, 215 receive same detection data by the function of the delay circuit 212 in FIG. 2B, both for the B1 channel and for the B2 channel. The register readings by the fifth and sixth I/O ports 216, 217 of the CPU 200 are executed respective in synchronization with the first and second octet synchronization signals 452, 453 released from the first and second FAW detectors 214, 215.

On the other hand, the first to fourth, seventh and eighth I/O ports 206–209, 218, 219 effect reading and writing operations in synchronization with the respective timings of octet data transfer in the same transmission data.

Figure 6:
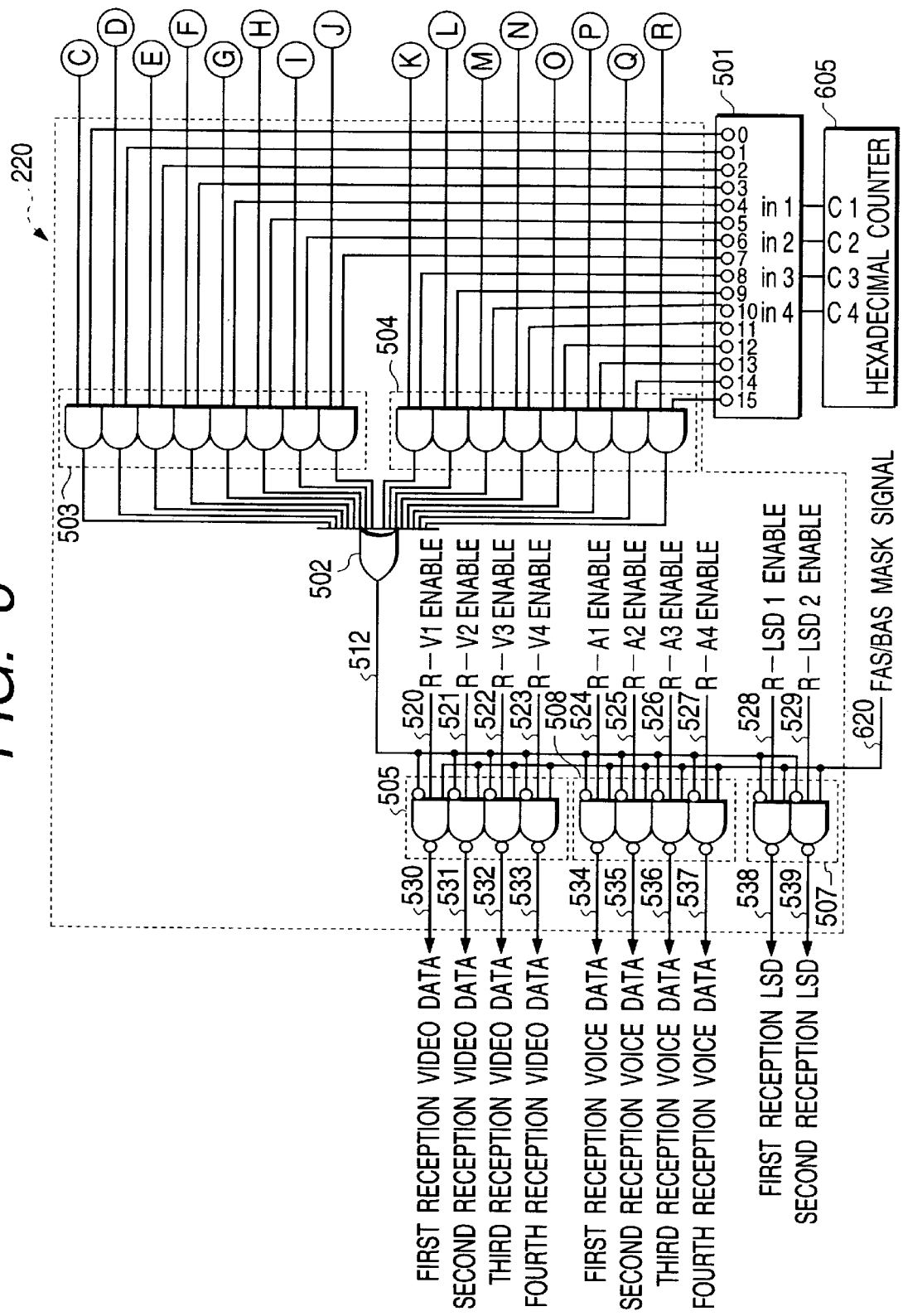
FIGS. 6 and 7 are block diagrams showing the detailed circuit configuration of seventh and eighth I/O ports and a second P/S converter in the above-mentioned apparatus.
Figure 7:
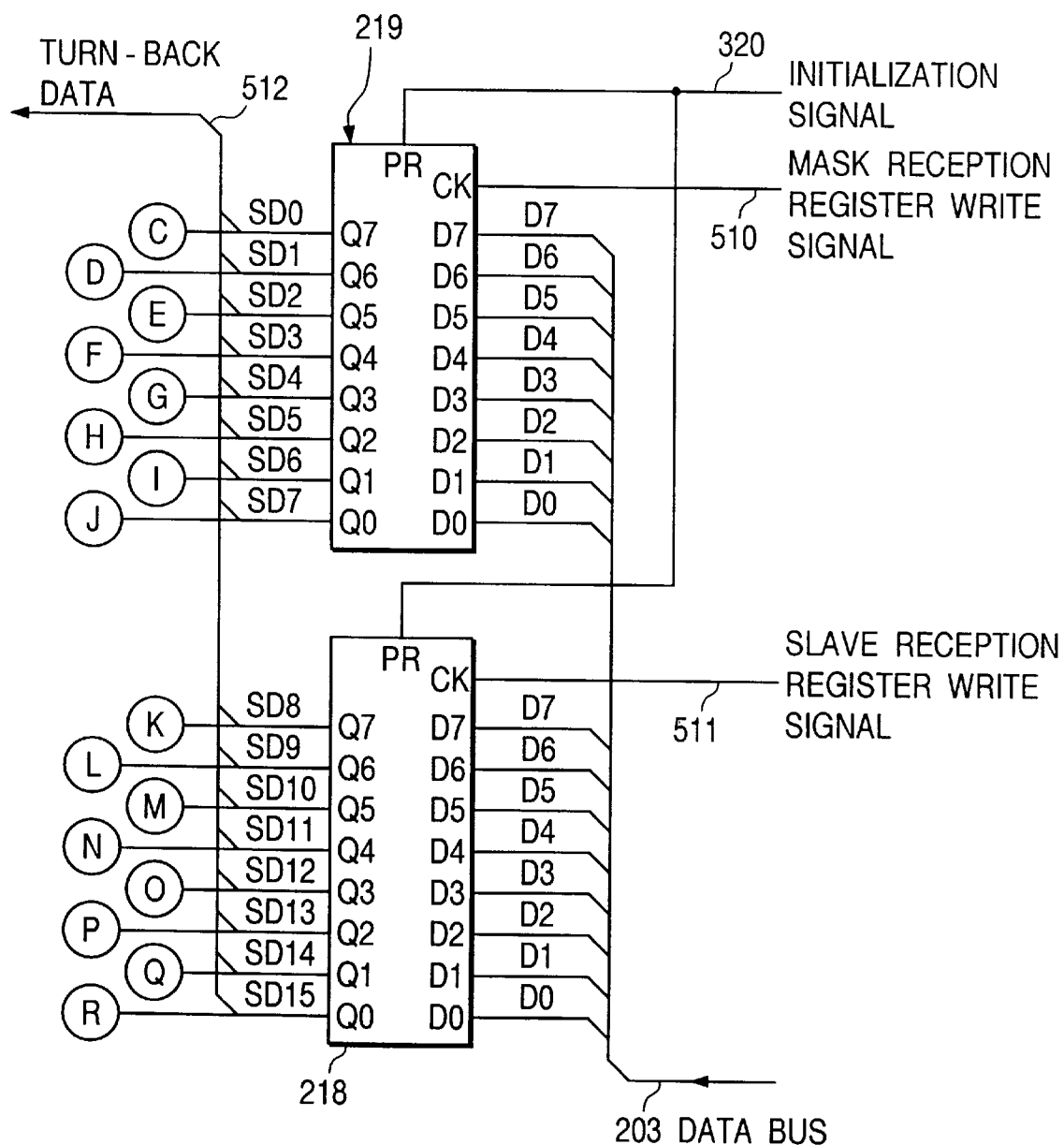

FIGS. 6 and 7 show the detailed structure of the seventh I/O port 219, the eighth I/O port 218 and the second P/S converter 220.

In FIGS. 6 and 7, I/O registers 219, 218 of which inputs D0–D7 are connected to the data bus 203 of the CPU 200 effect data writing according to reception register write signals 510, 511 from the CPU 200.

A hexadecimal counter 605 is initialized to 0 in synchronization with the octet timing of the transmission data and effects upcounting in synchronization with the bit timing of the transmission data, whereby C4–C1 are upcounted in succession from "0000" to "1111".

A hexadecimal decoder 501 releases an H-level signal in one of the outputs O0–O15, according to the input values i4–i1. As the inputs i4–i1 are connected to the count outputs C4–C1, the outputs O0–O15 of the hexadecimal decoder 501 change in such a manner that the output O0 assumes the H-level while the outputs O1–O15 assume the L-level at the start of the transmission octet timing signal, and, at the next clock, the output O1 assumes the H-level while the outputs O0 and O2–O15 assume the L-level. Thereafter the H-level state shifts in succession in the order of O2, O3, ... O15, O0, O1, ... in synchronization with the transmission clock.

Gates 503, 504 select one of inputs SD0–SD15 according to the H-level output from the hexadecimal decoder 501, and release serial reception data 512 through an OR gate 502. As a hexadecimal counter 605 effects counting operation in synchronization with the transmission data timing signal of 128 kHz, this circuit constitutes a second S/P converting circuit 220 for converting the parallel reception data, stored in the seventh and eighth I/O registers 218, 219 shown in FIG. 2A, into serial data of 128 kHz.

R-V1 to R-V4 enable signals 520–523 respectively indicate the assignment of the first to fourth reception video data to the subchannels in the frame corresponding to the ITU-TSS recommendation H.221. For example, when the first reception video data are assigned to the subchannels #7 and #8 of the master frame, the R-V1 enable signal 520 assumes the H-level state while the outputs O6 and O7 of the hexadecimal decoder 501 release H-level signals, but assumes the L-level state in other timings. Functions are similar in the R-V2 to R-V4 enable signals 521–523. If the reception video data are not assigned, the R-V1 to R-V4 enable signals 520–523 always remain at the L-level state.

R-A1 to R-A4 enable signals 524–527 respectively indicate the assignment of the first to fourth reception voice data to the subchannels in the frame corresponding to the ITU-TSS recommendation H.221. Each of these signals assumes the H-level state at the timing signal of the corresponding subchannel, as in case of the R-V1 enable signal 520 explained above.

R-LSD1 and R-LSD2 enable signals 528, 529 respectively indicate the assignment of the first and second reception LSD communication data to the subchannels in the frame corresponding to the ITU-TS recommendation H.221. Each of these signals assumes the H-level state at the timing signal of the corresponding subchannel, as in case of the R-V1 enable signal 520 explained above.

An FAS/BAS mask signal 620 indicates that the corresponding bit of the serial data 512 is at the timing of the FAS or BAS bit position in the frame structure according to the ITU-TS recommendation H.221, and assumes the H-level state at the timing of the FAS or BAS bit position but assumes the L-level state otherwise.

Serial reception data 512 are gated by the enable signals 520–529 according to the different kinds of data and by the FAS/BAS mask signal 620 at the gates 505, 506, 507 which respectively release the reception video data 530–533 to the video decoding units 7–10, the reception voice data 534–537 to the voice decoding units 11–14, and the reception LSD 538, 539 to the LSD communication control units 20, 21.

Figure 8:
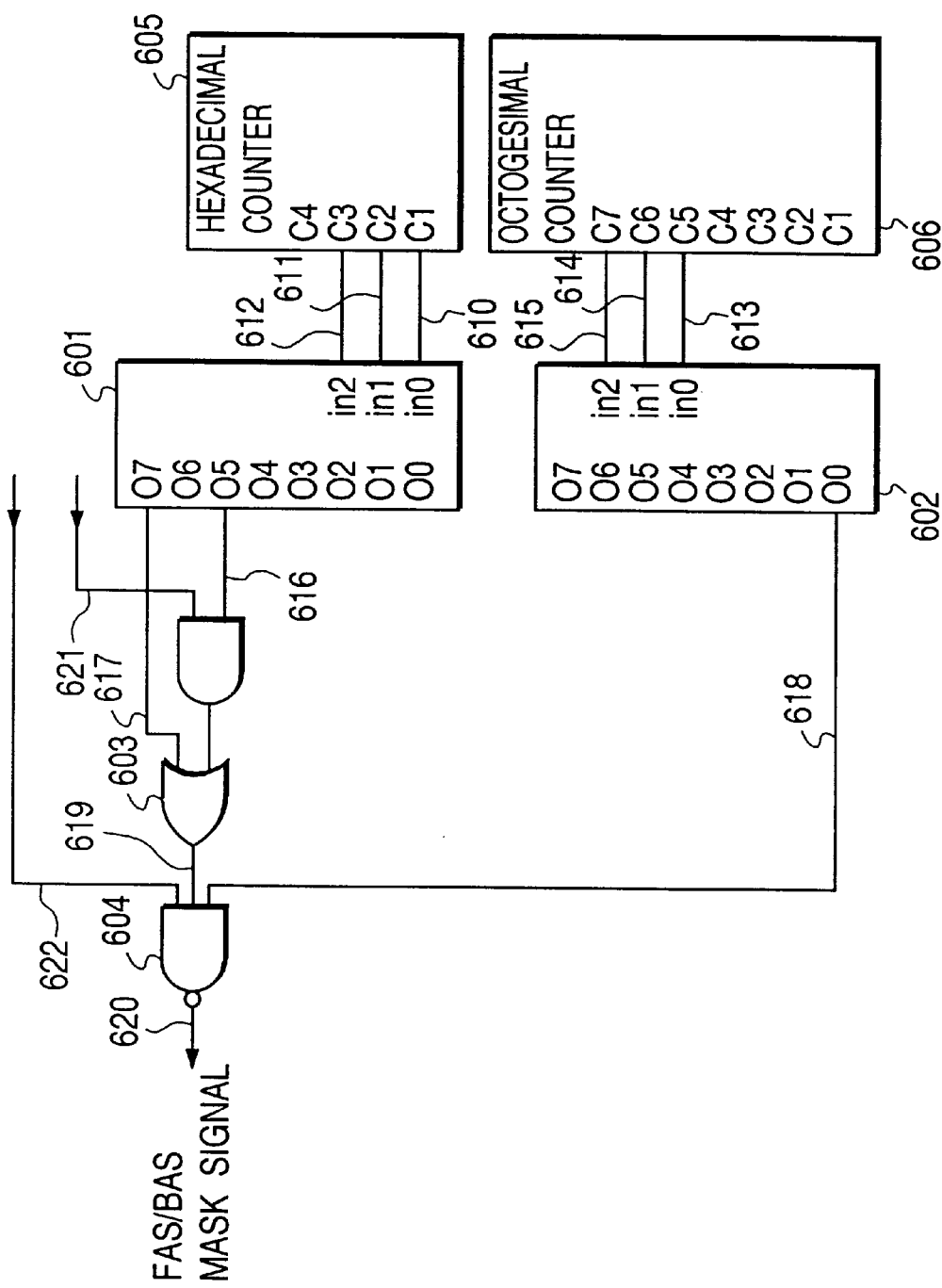
FIG. 8 is a block diagram showing the configuration of an FAS/BAS mask signal generating circuit in the above-mentioned apparatus.

FIG. 8 shows a circuit for generating the FAS/BAS mask signal 620. In FIG. 8 there are provided a hexadecimal counter 605 which effects upcounting in synchronization with the transmission data clock and is initialized to 0 in synchronization with the transmission octet timing, and an octogesimal counter 606 which effects upcounting in synchronization with the transmission octet timing signal and generates the timing signal constituting the frame structure of the transmission data according to the aforementioned recommendation H.221.

A first octonary decoder 601 releases an H-level signal in succession from one of the outputs O0–O7 corresponding to the count therein, according to input counts in2–in0. The inputs in2–in0 are connected only to the lower three bits 610–612 of the count outputs C4–C1 of the hexadecimal counter 605. Therefore, for example the output O7 (617) of the octonary decoder 601 releases an H-level signal when the hexadecimal counter 605 has an output "7" corresponding to the eighth count and an output "15" corresponding to the sixteenth count. In this manner the outputs O0–O7 of the octonary decoder 601 respectively indicate the timings of the subchannels #1–#8 in the master transmission frame and in the slave transmission frame.

A second octonary decoder 602 releases, as in the first octonary decoder 601, an H-level signal in one of the outputs O0–O7 corresponding to the count therein, according to input counts in2–in0. The inputs in2–in0 are connected to the upper three bits C7 (615)–C5 (612) of the count outputs of the octogesimal counter 606. Therefore, the output O0 releases an H-level signal when the octogesimal counter 606 has a count 0–15 while the output O1 releases an H-level signal when the octogesimal counter 606 has a count 16–31. Similarly, the outputs O2–O7 release L-level signals in succession, at every 16 counts the octet timing signal.

A signal 621 is used by the CPU 200 for enabling or disabling the dummy FAS/BAS mask signal 616 of the subchannel #6, respectively in the L-level or H-level state.

A signal 622 is used by the CPU 200 for enabling or disabling the FAS/BAS mask, respectively in the H-level or L-level state. The BAS/FAS mask is disabled in case the communication data do not assume the frame structure of the aforementioned ITU-TS recommendation H.221 or in case of the non-frame mode in the abovementioned recommendation H.221.

Figure 17:
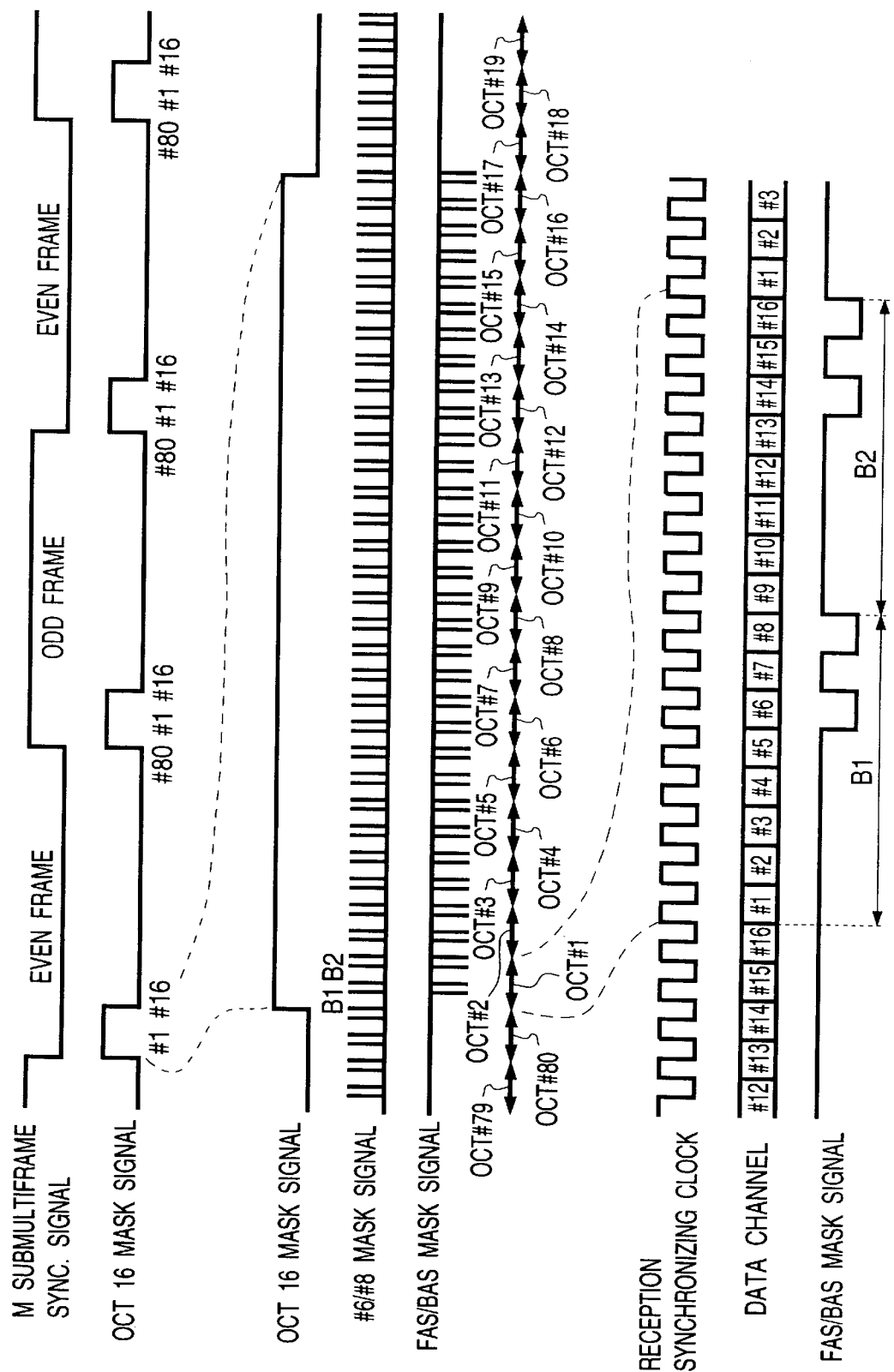
FIG. 17 is a timing chart showing the function timing of the FAS/BAS mask signal generating circuit in the above-mentioned apparatus.

FIG. 17 shows a timing chart showing an example of the FAS/BAS mask signal. In FIG. 17, an M sub-multi frame synchronization signal is a sub-multi frame synchronization signal of the master channel side in the frame according to the ITU-TS recommendation H.221 in the transmission data, and indicates an even frame at the H-level state and an odd frame at the L-level state. An OCT 16 mask signal indicates a period from the first to sixteenth octet timings, and is obtained as the output signal 618 of the output O0 of the octonary decoder 602 shown in FIG. 6. A #6/#8 mask signal indicates the timing of the subchannels #6 and #8 and is obtained by the output signal 619 of the gate 603 shown in FIG. 8.

As the reception synchronization clock signal and the transmission synchronization clock signal are same in the present embodiment, the timing of the FAS/BAS mask signal in FIG. 17 is shown with reference to the reception synchronization clock signal for the purpose of simplicity, but more precisely it functions in synchronization with the transmission clock signal since the hexadecimal counter 605 and the octogesimal counter 606 function in cooperation with the transmission synchronization clock signal of the transmission data as shown in FIG. 8.

From FIG. 17, it will be understood that the data of the bit positions of the FAS/BAS and dummy FAS/BAS shown in FIG. 9 can be eliminated from the serial data 512 by gating with the FAS/BAS mask signal.

[Second embodiment]

In the foregoing, first embodiment, the B channels are connected to respectively different locations with a single basic ISDN rate, but it is also possible to employ plural basic rates and to connect the lines of such different basic rates to different locations.

Also, the rate is not limited to the basic LSDN rate, but there can be utilized a data communication line of a higher or lower speed, or there can also be utilized the connection with an ordinary telephone line through a modem.

Also, the channel containing the dummy FAS/BAS signal which are pseudo synchronization signal may be used for any kind of data.

Also, the number of the pseudo synchronization signal is not limited to one, and it is also possible to attach plural pseudo synchronization signals to different subchannels.

Also, the foregoing first embodiment attains various functions by a hardware, but such functions may naturally be attained also by a software. This software may be stored in various recording medium (CD-ROM, optical disc, floppy disc, etc.).

As explained in the foregoing, in selecting arbitrary one or plural information from the information of plural media received from a communication terminal of a first location and effecting turn-back transmission of such selected information to a communication terminal of a second location, there is provided a configuration of adding a pseudo synchronization signal to the received information containing the FAW signal defined in the ITU-TS recommendation H.221 and effecting turn-back transmission of thus formed transmission information not containing the FAW signal. As a result, it is rendered possible to assign the reception data, assigned to the subchannel #8, to any subchannel in the transmission, and also to receive the communication data in which the partner terminal has assigned the reception data, originally assigned to the subchannel #8, to any other subchannel.

It is therefore rendered possible to set subchannels for the data to be turn-back transmitted and those for the data not be turned back, so that the data processing can be facilitated.

It is also rendered possible to dispense with the process time required for decoding and re-encoding in the configuration without the turn-back transmission, to reduce the CPU load in each terminal resulting from the decoding and re-encoding, and to avoid the data deterioration resulting from the decoding and re-encoding.

What is claimed is:

1. A communication apparatus for effecting communication by communication data, at least containing image data and a signal relating to the synchronization of communication, among plural locations under predetermined formatting, said apparatus comprising:

reception means for receiving said communication data;

extraction means for extracting said signal relating to the synchronization from said received communication data;

process means for processing said image data according to said extracted signal; and transmission means for effecting transmission by adding image data generated in the present apparatus to said received communication data and effecting said predetermined formatting, wherein said received communication data has been divided to a plurality of subchannels each having same data amount, a part extracted from said signal relating to the synchronization is replaced with dummy data when data of subchannel which included said signal relating to the synchronization extracted from said extraction means among said subchannels is turned back to the other subchannel.

2. A communication apparatus according to claim 1, wherein plural units thereof positioned in plural locations are arranged in a ring shape through communication lines.

3. A communication apparatus according to claim 1, wherein said communication data include audio data and control data.

4. A communication apparatus according to claim 1, wherein said transmission means is adapted, at said predetermined formatting, to add a signal relating to the synchronization of the communication between the present apparatus and a destination apparatus.

5. A communication apparatus according to claim 1, wherein the image data contained in said communication data are encoded, and said process means at least includes decoding means for said encoded image data.

6. A communication apparatus according to claim 1, wherein said transmission means is adapted to effect predetermined formatting of said received communication data without decoding thereof, together with image data generated and encoded in the present apparatus.

7. A communication apparatus according to claim 1, wherein said predetermined format is a format recommended by the ITU-TS recommendation H.221.

8. A communication apparatus according to claim 1, wherein said signal relating to the synchronization is an FAW signal defined in the ITU-TS recommendation H.221.

9. A communication apparatus according to claim 4, wherein said predetermined format is a format recommended by the ITU-TS recommendation H.221.

10. A communication apparatus according to claim 4, wherein said signal relating to the synchronization is an FAW signal defined in the ITU-TS recommendation H.221.

11. A communication apparatus according to claim 6, wherein said predetermined format is a format recommended by the ITU-TS recommendation H.221.

12. A communication apparatus according to claim 6, wherein said signal relating to the synchronization is an FAW signal defined in the ITU-TS recommendation H.221.

13. A communication apparatus according to claim 7, wherein said signal relating to the synchronization is an FAW signal defined in the ITU-TS recommendation H.221.

14. A communication method for effecting communication by communication data, at least containing image data and a signal relating to the synchronization of communication, among plural locations under predetermined formatting, the method comprising steps of:

receiving said communication data;

extracting said signal relating to the synchronization from said received communication data;

processing said image data according to said extracted signal; and effecting transmission by adding image data generated in a self apparatus to said received communication data and effecting said predetermined formatting;

wherein said received communication data has been divided to a plurality of subchannels each having same data amount, a part extracted from said signal relating to the synchronization is replaced with dummy data when data of subchannel which included said signal relating to the synchronization extracted in said extraction among said subchannels is turned back to the other subchannel.

* * * * *